(12) United States Patent
Servida

(10) Patent No.: US 9,890,065 B2
(45) Date of Patent: Feb. 13, 2018

(54) APPARATUS FOR TREATING A FLUID

(71) Applicant: IDROPAN DELL'ORTO DEPURATORI S.R.L., Milan (IT)

(72) Inventor: Tullio Servida, Milan (IT)

(73) Assignee: IDROPAN DELL'ORTO DEPURATORI S.R.L., Milan (IT)

( * ) Notice: Subject to any disclaimer, the term of this patent is extended or adjusted under 35 U.S.C. 154(b) by 254 days.

(21) Appl. No.: 14/951,522

(22) Filed: Nov. 25, 2015

(65) Prior Publication Data

US 2016/0145124 A1 May 26, 2016

(30) Foreign Application Priority Data

Nov. 25, 2014 (IT) .............................. PD2014A0324

(51) Int. Cl.
| | | |
|---|---|---|
| *C02F 1/46* | (2006.01) | |
| *C02F 1/469* | (2006.01) | |
| *B01D 61/48* | (2006.01) | |
| *C02F 1/461* | (2006.01) | |

(52) U.S. Cl.
CPC .......... *C02F 1/4691* (2013.01); *B01D 61/485* (2013.01); *C02F 1/4602* (2013.01); *C02F 1/4604* (2013.01); *C02F 1/46109* (2013.01); *C02F 2001/46133* (2013.01); *C02F 2001/46138* (2013.01)

(58) Field of Classification Search
None
See application file for complete search history.

(56) References Cited

U.S. PATENT DOCUMENTS

| | | |
|---|---|---|
| 5,360,540 A | 11/1994 | Andelman |
| 6,413,409 B1 | 7/2002 | Otowa et al. |
| 2007/0158188 A1 | 7/2007 | Andelman |
| 2009/0020430 A1 | 1/2009 | Yang et al. |
| 2010/0226069 A1* | 9/2010 | Norieda ................. H01G 9/016 361/502 |

FOREIGN PATENT DOCUMENTS

| | | |
|---|---|---|
| EP | 2253593 A1 | 11/2010 |
| IT | PD2012A000363 | 11/2012 |
| IT | PD2013A000065 | 3/2013 |

* cited by examiner

Primary Examiner — Arun S Phasge
(74) Attorney, Agent, or Firm — Mark M. Friedman

(57) ABSTRACT

Apparatus for treating a fluid, which comprises at least one pair of electrode layers power supplied to different polarities, delimiting between them a passage chamber for a first fluid flow containing ionized particles and exerting hydraulic pressure on at least one surface of such electrode layers. Each electrode layer comprises a metal conduction layer electrically connected to a power supply and at least one layer of graphite having a wet surface directed towards the passage chamber and a dry surface compressed, by the hydraulic pressure exerted by the first fluid contained in the passage chamber, directly in adherence against the metal conduction layer, in order to distribute the current of the power supply from the metal conduction layer to the layer of graphite.

16 Claims, 14 Drawing Sheets

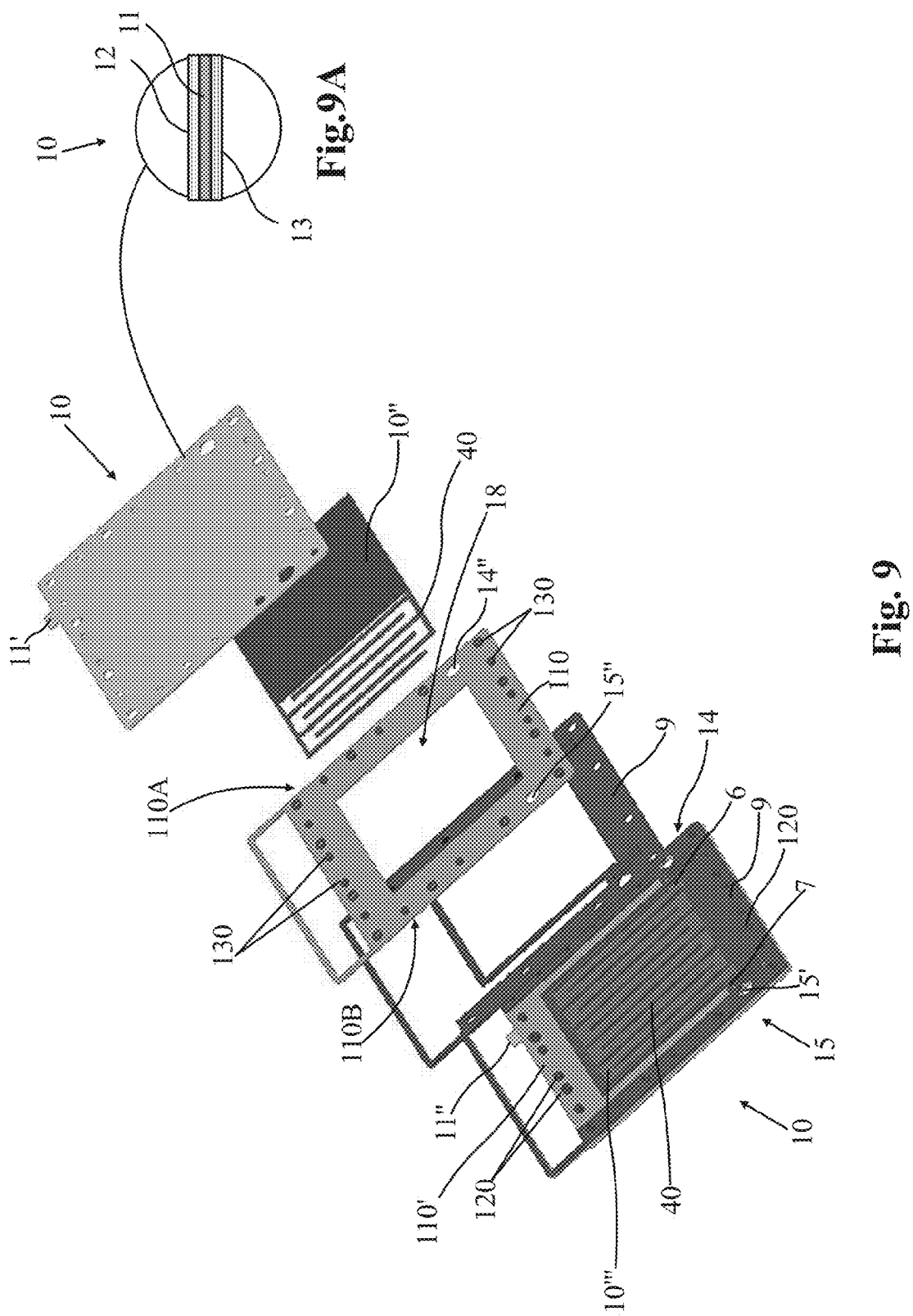

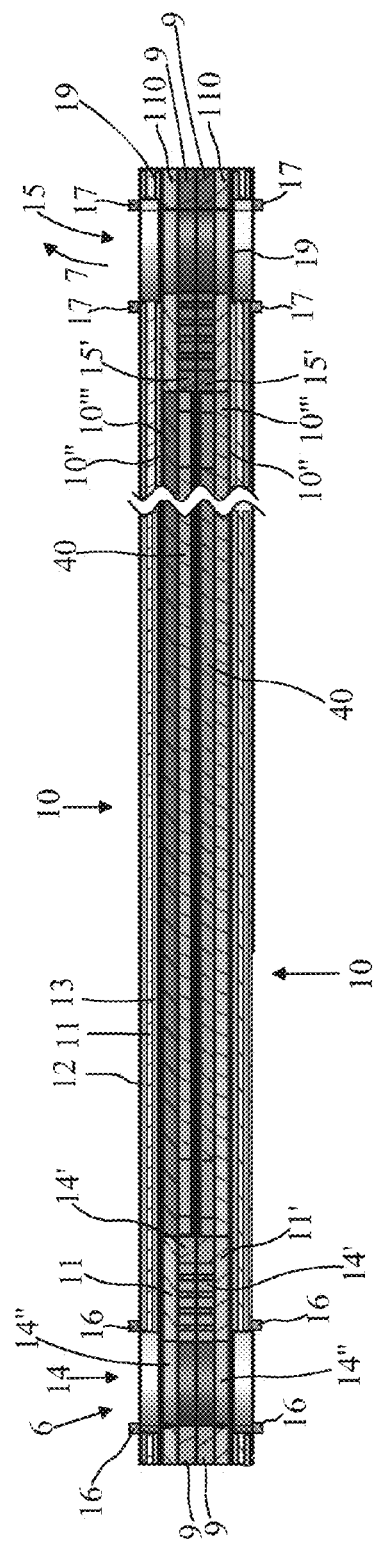
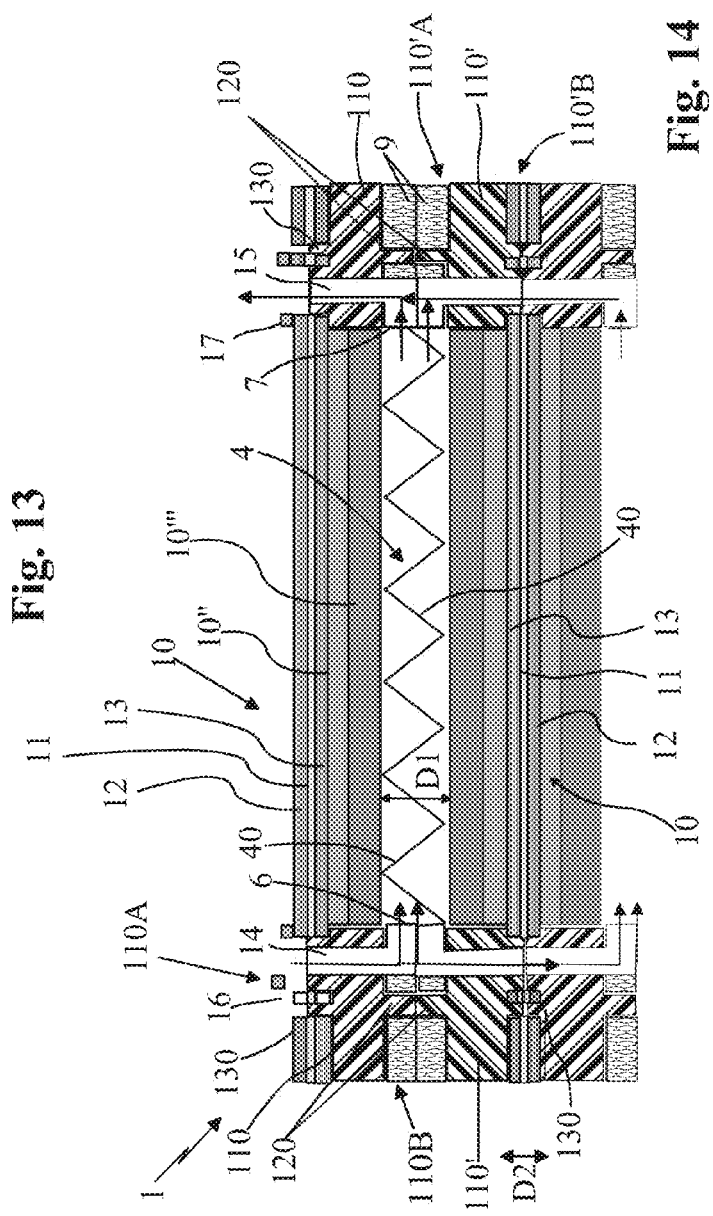
Fig. 13
Fig. 14

APPARATUS FOR TREATING A FLUID

FIELD OF APPLICATION

The present invention regards an apparatus for treating a fluid, according to the preamble of the independent claim.

More in detail, the present apparatus for treating a fluid is intended to be advantageously employed in purification apparatuses for removing from fluids, and more particularly usually from liquids, undesired concentrations of contaminants, e.g. constituted by salts dissolved at their interior.

The present apparatus can also be employed in apparatuses adapted to concentrate within fluids, particularly of industrial processes, ionized particles in order to facilitate the recovery or disposal thereof.

The present apparatus can be intended for multiple applications both in industrial and civil fields, such as the desalination of sea water, the softening of particularly hard waters, the removal, from water, of salts (such as chlorides and sulfates), as well as for the removal, from any one liquid, for example of nitrates, nitrites, ammonia, heavy metals, organic substances of micro-pollutants in general, or for the deionization of fluids, for example of industrial processes, or for the concentration of pollutant substances that are difficult to dispose of or advantageous to recover for a reuse.

The apparatus, object of the present invention, can also be incorporated in a machine, in particular for domestic use, and in this case it will allow purifying the water intended for such machine, allowing the latter to best achieve the functionalities for which it is used, such as the production of drinks, cleaning of dishes, clothes etc.

The present invention is therefore generally inserted in the industrial field of the production of apparatuses for treating fluids and in particular for removing ionized particles from fluids.

STATE OF THE ART

Different types of apparatuses for treating fluids containing ionized particles are known, of the type that is the object of the present invention.

For example, apparatuses are known for purifying fluids which make use of the principle of capacitive deionization for removing ionized particles from a fluid. Such apparatuses comprise a plurality of electrodes superimposed in succession, between which a fluid flow to be purified is made to pass. The electrodes face each other and are charged with opposite polarities by a direct current power supply.

In operation, such known apparatus provides for the alternation of operating steps, in which the ions present in the fluid are captured on the opposite electrodes, and regeneration steps, in which the ions accumulated on the electrodes are removed by means of a washing fluid.

The electrodes of the flow-through capacitors electrostatically absorb and release the contaminants of ion charges and actively participate in the process of deionization of the liquid to be treated.

The electrodes of these apparatuses are also usually power supplied by manifolds, e.g. made of graphite, and are obtained with layers of electrically conductive materials (e.g. typically made of carbon) in order to absorb high quantities of ionized particles on their surface.

Flow-through capacitors of the above-indicated known type are for example described in the U.S. Pat. No. 6,413,409, U.S. Pat. No. 5,360,540.

Apparatuses are also known for purifying a fluid containing ionized particles, for example described in the patent application IT PD2013A000065, which comprise at least two operating chambers traversed by a fluid to be treated, and each delimited by a respective electrode that can be power supplied to opposite polarities. Between the two operating chambers, a third evacuation chamber is interposed containing a porous electric conductor traversed by a washing fluid and delimited by two opposite walls which, together with the electrodes, define the aforesaid operating chambers. The aforesaid walls have associated at least one ion-selective area, which is susceptible of being traversed by charged particles of corresponding polarity contained in the two contiguous operating chambers and subjected to the action of the electric field generated by the electrodes. The porous electrical conductor is in turn susceptible of reducing the electric field inside the third evacuation chamber, such that the ion-selective areas of the walls of the third evacuation chamber are capable of repelling the charged particles of corresponding polarity contained in the third evacuation chamber and subjected to the action of the electric field, which has much reduced value due to the screening effect of the porous electrical conductor.

Apparatuses are also known for purifying a fluid, e.g. described in the patent application IT PD2012A000363, comprising at least one first chamber, through which a fluid to be treated containing ionized particles flows, and at least one second and one third chamber respectively containing a first positively-charged electrode and a second negatively-charged electrode, charged by a power supply source. The first chamber is interposed between the second and the third chamber and is, more in detail, separated from the second and from the third chamber respectively by means of a first septum and a second septum permeable to the anionic and cationic particles of the fluid to be treated. The second chamber and the third chamber are continuously traversed by a first and second slurry respectively containing first and second corpuscles susceptible of being electrostatically charged in contact with the first positive electrode of the second chamber and of the third chamber. The charged particles of the fluid to be treated are forced by the power supply source to pass through the first and the second permeable septum, from the fluid to be treated to the first and second slurry, and are absorbed by the first and second positively and negatively electrostatically charged corpuscles of the two slurries.

The apparatuses of known type, described in brief above, are comparable due to the presence of a containment structure, usually made of plastic, and of a plurality of superimposed electrodes, which are housed in the containment structure.

The electrodes have sheet-like extension and are extended on parallel planes inside the containment structure of parallelepiped shape or they are extended with spiral progression inside a cylindrical structure.

The flow of fluid to be treated can contain ionized particles of any type (also of organic type) and is made to pass between the electrodes, in order to obtain, in accordance with the applications, the concentration of a solute of ionized particles, i.e. a solvent from which such particles have been removed (whether these are ions, or other charged substances in accordance with the specific application).

The electrodes are formed with conductor material layers facing each other and charged to opposite polarities by a direct current power supply in order to generate an electrostatic field between the contiguous electrodes.

In the case of apparatuses with flow-through capacitors, for example, the electrodes electrostatically absorb and release the ionic charge contaminants, and for such purpose have a cover layer formed by porous structures of conductor materials. Numerous materials employable for attaining such electrodes are known for such purpose, such as spongy active carbon in the form of sheets or fibers, as described for example in the U.S. Pat. No. 6,413,409, or sheets of a mixture comprising FIFE, as described for example in the U.S. Pat. No. 6,413,409.

In order to increase the performances of the apparatuses with flow-through capacitors, the surfaces of the conductor layers of the electrodes are often associated with permeable or semi-permeable material layers, capable of selectively trapping the ions which migrate towards the corresponding electrode under the action of the field, selectively attaining membranes of anionic exchange type or of cationic exchange type.

An important drawback which is encountered in making the electrodes of the apparatuses of known type lies in the difficulty of uniformly carrying the current from the manifold, generally made of graphite, to the electrode part directly in contact with the fluid to be treated and usually made of porous carbon.

Graphite, while having an optimal sealing capacity—being substantially impermeable to the fluids to be treated, especially if suitably treated —, has limited mechanical characteristics with high fragility and a tendency towards exfoliation and an anisotropic conductivity. As is known, graphite is in fact a good two-dimensional electric conductor with high planar conductivity, i.e. in the graphite plane, but with conductivity along the direction transverse to the graphite planes, much lower and usually only allowed due to the presence of a tunneling conduction mechanism.

The selection of graphite is in practice obligatory, however, given its high resistance to corrosion and oxidation phenomena, which allows it to maintain its mechanical and electrical properties over time.

In this situation, an important drawback in the apparatuses of known type lies in the conductivity limits of graphite, which involves considerable limitations in the current applicable at the electrodes or, in an equivalent manner, which involves the arrangement of electrodes with considerable surface areas in order to distribute the current necessary for the apparatus performances.

A further drawback in the electrodes of the apparatuses of known type has proven to be represented by the use of binders for fixing together the different layers of the electrodes with different characteristics, such as for fixing carbon on the graphite support, which inevitably reduce the active surface area of the graphite, further deteriorating the electrical performances thereof.

The patent US 2007/0158185 describes a further apparatus of known type for treating a fluid, which comprises multiple pairs of electrodes that are facing each other, in a manner such to delimit multiple passage chambers susceptible of being traversed by a flow of water to be treated. The electrodes are made of porous material, such as in particular active carbon, with the possible addition of further materials like graphite, conductive polymers, ceramics, etc.

The apparatus also comprises electrical power supply means connected to the electrodes by means of electrical manifolds passing within the passage chambers and susceptible of being wet by the water that traverses the passage chambers themselves. The electrical manifolds are obtained with graphite sheets or with metal wires coated with a polymer layer in order to protect the metal from the water.

Also the latter solution of known type has proven in practice that it does not lack drawbacks.

In particular, the attainment of the electrical manifolds in graphite involves the above-discussed drawbacks due to the limited mechanical characteristics and due to the anisotropic conductivity of graphite. The alternative embodiment of the apparatus described in the patent US 2007/158185, which provides for attaining the electrical manifolds with metal wires coated with a polymer layer, requires the execution of specific processing in the production process, with a consequent increase of the costs of making the apparatus itself.

In addition, the drawback due to the use of binders for fixing the electrodes to the electrical manifolds remains; as stated above, this causes a deterioration of the electrical performances of the manifolds.

PRESENTATION OF THE INVENTION

In this situation, the problem underlying the present invention is therefore that of eliminating the drawbacks of the abovementioned prior art, by providing an apparatus for treating a fluid which allows an improved and greater distribution of current to the electrodes.

Another of the present invention is to provide an apparatus for treating a fluid which is simple and inexpensive to make and entirely reliable in operation.

Another of the present invention is to provide an apparatus for treating a fluid, which has high efficiency.

BRIEF DESCRIPTION OF THE DRAWINGS

The technical characteristics of the finding, according to the aforesaid objects, can be clearly seen in the contents of the below-reported claims and the advantages thereof will be clearer in the following detailed description, made with reference to the enclosed drawings which represent several merely exemplifying and non-limiting embodiments of the invention, in which:

FIG. 9 schematically shows the cell with flow-through capacitors of the apparatus of FIG. 1, in a partially exploded view;

FIG. 9A shows an enlarged detail of FIG. 9 relative to the section of the electrode;

FIG. 13 schematically shows a sectional view made along the line XIII-XIII of the half-cell of FIG. 11, in which the thicknesses have been increased with respect to the other dimensions in order to facilitate comprehension;

FIG. 14 shows a very schematic section view, with some parts not indicated in order to better illustrate other parts, of a variant embodiment of the same first apparatus embodiment in which the thicknesses have been increased to an even greater extent with respect to the other dimensions in order to facilitate comprehension;

DETAILED DESCRIPTION OF A PREFERRED EMBODIMENT

Figure 1:
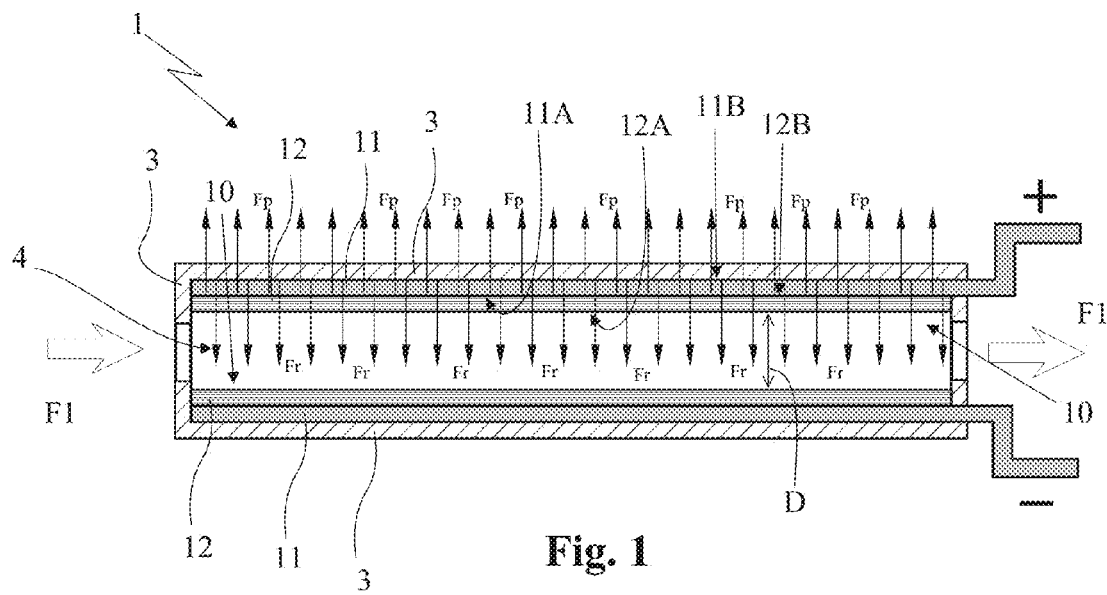
FIG. 1 shows a general scheme of one embodiment of an apparatus for treating a fluid according to the present invention, which is provided with only two superimposed and flat electrodes, each comprising a single impermeable layer of graphite; in accordance with this schematic figure, retention elements are provided for the electrodes that are constituted by a containment structure in which the electrodes themselves are housed.

With reference to the enclosed drawings, reference number 1 overall indicates an embodiment of an apparatus for treating a fluid containing ionized particles, object of the present invention.

The present apparatus 1 is adapted for being employed for treating fluids containing ionized particles through different principles, all comparable with the action of provided electrode layers on the ionized particles, for example for the purpose of removing such particles from the fluids, or for the purpose of concentrating such particles.

Hereinbelow, the term ionized particles will generically indicate any contaminant dissolved in the fluid to be treated that is able to be attracted by an electrostatic field, such as in particular the ions dissolved in a solution, or even other polarized contaminants for example of organic substances or generally of micro-pollutants.

The apparatus 1 is therefore adapted to be employed for the deionization of industrial process fluids and for the deionization of water, in particular for the desalination of sea water, being in particular capable of removing, from its interior, salts in solution (such as chlorides and sulfates), nitrates, nitrites, ammonia, and other polarized contaminants of organic substances or micro-pollutants in general.

The apparatus for treating a fluid comprises, in a per se conventional manner, at least one pair of electrode layers 10, which are power supplied by a power supply to different polarities. The electrode layers 10 have a plate-like extension, or they are provided with a thickness much lower than the planar extension (whether this is intended to form a plane or, for example, a rolled-up spiral form). The electrode layers 10 are facing each other, separated by a spacing distance (D) and together delimit at least one passage chamber 4.

The latter is traversed by at least one first fluid flow F1 containing ionized particles and exerting a hydraulic pressure on the two opposite first wet surfaces of the electrode layers 10. In particular, the passage chamber 4 is provided with two opposite sides, preferably flat, directed in opposite directions from each other.

More in detail, each side of the passage chamber 4 is delimited by the corresponding electrode layer 10 and in particular by the corresponding wet surface of the latter.

Retention elements 3 are also provided, adapted to transmit a mechanical counter-pressure on the pair of electrode layers 10 in order to maintain them in position.

According to the idea underlying the present invention, each electrode layer 10 of the at least one provided pair of layers comprises at least one metal conduction layer 11, electrically connected to the power supply and provided with at least one first contact surface 11A, and at least one first impermeable layer of graphite 12 provided with a first wet surface 12A directed towards the passage chamber 4 and with a first dry surface 12B compressed by the hydraulic pressure exerted by the first fluid F1 contained in the passage chamber 4, directly in adherence against the first contact surface 11A of the metallic layer 11 in order to distribute the current of the power supply from the first metal conduction layer 11 to the first impermeable layer of graphite 12.

According to the invention, the first impermeable layer of graphite 12 is arranged as a sealing cover on the first contact surface 11A of the metal conduction layer 11, in a manner such to prevent the fluid F1 (which traverses the passage chamber 4) from coming into contact with the metal conduction layer 11 itself, in order to prevent the deterioration of the latter, for example due to oxidation and/or corrosion.

In this manner, advantageously, the first impermeable layer of graphite 12 sealingly isolates the metal conduction layer 11 (and in particular the first contact surface 11A of the latter) from the fluid F1 which traverses the passage chamber 4.

In particular, the first impermeable layer of graphite 12 is extended over the entire corresponding side of the passage chamber 4 and is interposed between the first contact surface 11A of the metal conduction layer 11 and the passage chamber 4, in order to separate the metal conduction layer 11 from the first fluid flow F1 that traverses the passage chamber 4 itself.

According to the idea underlying the present invention, the metal conduction layer 11 is electrically coupled to the first impermeable layer of graphite 12 due to the hydraulic pressure exerted by the fluid which, in the passage chamber 4, compresses the same first impermeable layer of graphite 12 against the metal conduction layer 11.

The electrical contact between the metal conduction layer 11 and the first impermeable layer of graphite 12 occurs due to the same pressure supplied by the fluid in the passage chamber, without requiring complex coupling operations between layers during production.

For greater clarity, in the figures Fp indicates the pressure force exerted by the impermeable graphite layer 12 on the metal conduction layer 11, and Fr indicates the reaction force of the metal conduction layer 11, which will be due to a reaction of the retention elements 3 or, as explained hereinbelow, to the pressure force of a second impermeable layer of graphite 13 pressing against the metal conduction layer 11 on the other contact surface 11B of the latter.

Advantageously, the metal conduction layer 11 has thickness substantially comprised between 5 micron and 0.5 millimeters.

In particular, the lower limit of the value of the thickness of the metal conduction layer 11 is determined by the need to obtain sufficient mechanical strength and at the same time good electrical conductivity for the layer 11 itself (advantageously allowing low thicknesses of the layer 11 in order to reduce the costs for the materials and hence the costs of production of the apparatus).

Preferably, in specific application situations, it is opportune to arrange the metal conduction layer 11 with a sufficiently large thickness to allow the easy connection to the electrical power supply, e.g. by means of a spot welding of a wire (with single or double conductor) even of different material with respect to the metal conduction layer 11.

Advantageously, the metal conduction layer 11 is obtained with a sheet of metal material (such as aluminum, copper, brass, steel, stainless steel), in particular in order to possess good electrical conductivity and a reasonable mechanical strength.

Preferably, the metal sheet is made of aluminum (possibly superficially treated with galvanic processes, for example with the use of electric current or with electroless processes like chemical nickel-plating) since, in particular, the aluminum allows obtaining a good compromise between the characteristics of good conductivity and sufficient mechanical strength.

As will be better described hereinbelow, the apparatuses for treating fluids advantageously comprise, in a per se known manner, a plurality of pairs of electrode layers 10 arranged in succession along at least one direction Z substantially orthogonal to their layer-like extension, delimiting a plurality of passage chambers 4 and locked in mutual position by the aforesaid retention elements 3.

More in detail, the electrode layers 10 can be extended on separate planes, parallel to each other, in order to obtain in particular a stack structure usually with parallelepiped shape, or they could be extended with spiral progression (see the example of FIGS. 3 and 4) so as to in any case repropose a successive repetition of the electrode layers 10 in the direction Z, considered in radial sense.

Figure 3:
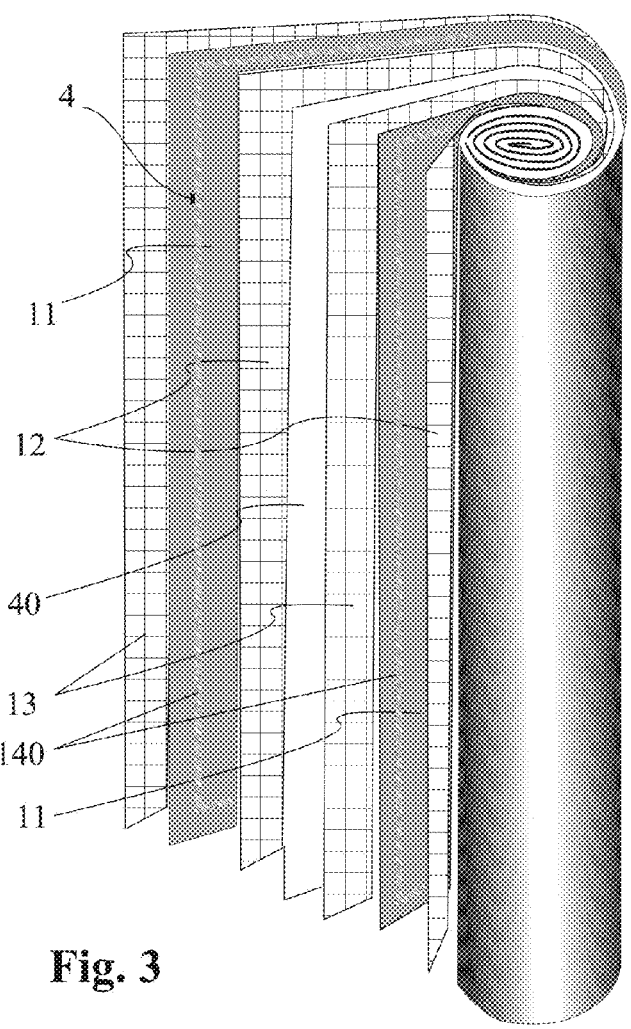
FIG. 3 schematically shows, in perspective view, a detail of an apparatus for treating fluids according to the invention, relative to electrodes wound as a spiral and forming planes of superimposition along a substantially radial axis.
Figure 4:
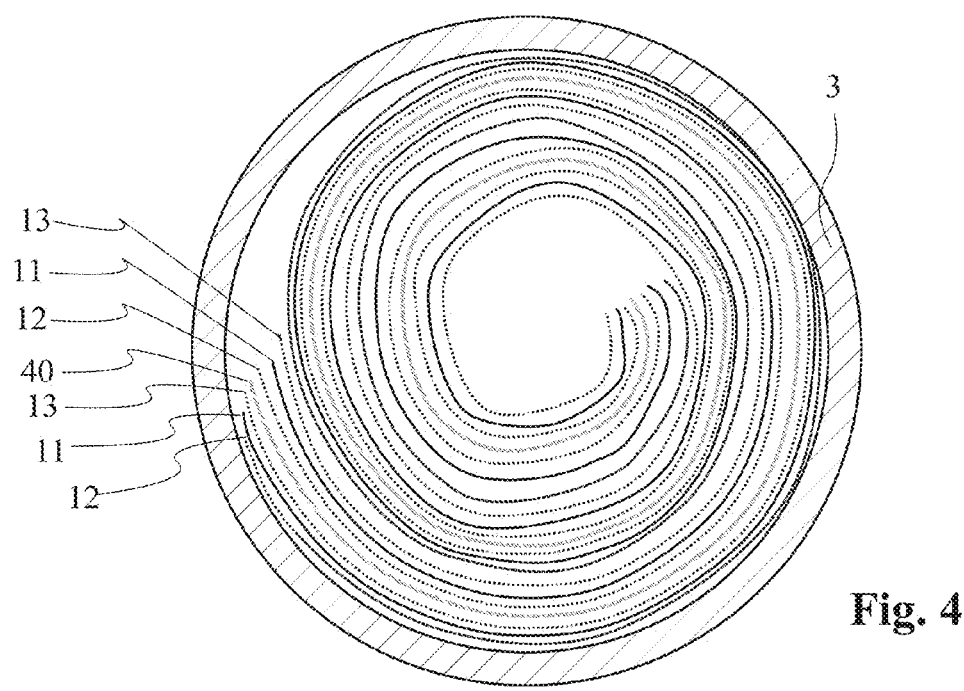
FIG. 4 schematically shows a cross section view of the apparatus of FIG. 3.

In other words, starting from at least one pair of electrode layers 10 or even from multiple pairs of electrode layers, the aforesaid plurality of superimposed layers can be obtained by winding such spiral layers (FIGS. 3 and 4). The spiral of wound layers can also be housed inside a substantially cylindrical containment structure 3.

Between the electrode layers 10, spacer layers 40 are advantageously interposed in the passage chambers 4; such spacer layers 40 can in turn be constituted by highly porous, non-conductive materials or by plastic nets, capable of isolating the electrodes, allowing the passage of the fluid flow, such as a porous synthetic material or other non-conductive spacer materials such as glass fiber or nylon fabric.

Figure 2:
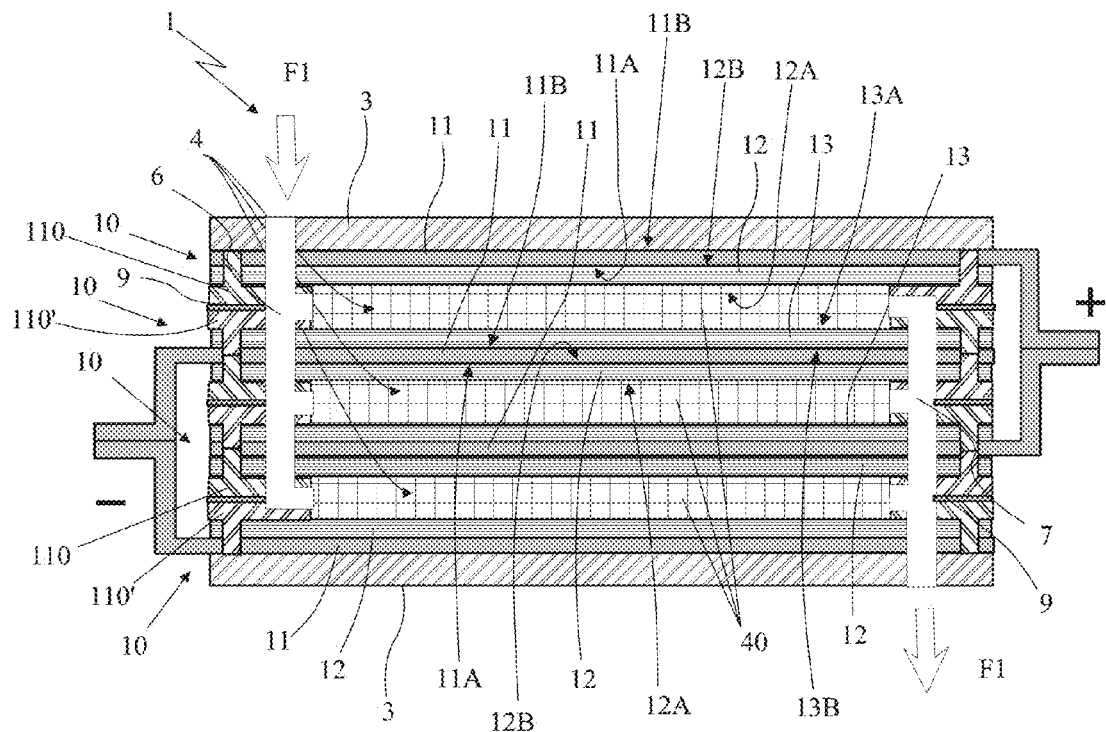
FIG. 2 shows a general scheme of one embodiment of an apparatus for treating fluids according to the invention, which is provided with multiple superimposed and flat electrodes, including the central ones provided with at least one second impermeable layer of graphite; in accordance with this schematic figure, the retention elements are obtained with tie rods acting on end plates; a plurality of intermediate support layers are also provided for unloading the pressures of the tie rods.

According to the invention, advantageously in accordance for example with the embodiment of FIGS. 2 and 3, the metal conduction layer 11 of each said electrode layer 10 is provided with a second contact surface 11B oriented in a direction opposite the first contact surface 11A, and each electrode layer 10 also at least comprises a second impermeable layer of graphite 13 provided with a second wet surface 13A directed towards a passage chamber 4' contiguous with the chamber 4 towards which the first wet surface 12A is directed of the first impermeable layer of graphite 12, and with a second dry surface 13B compressed by the hydraulic pressure directly in adherence against the second contact surface 11B of the metal conduction layer 11 in order to distribute the current of the power supply from the metal conduction layer 11 to the second impermeable layer of graphite 13.

In particular, the second impermeable layer of graphite 13 is arranged as a sealing cover on the second contact surface 11B of the metal conduction layer 11, in a manner such to prevent the fluid F1 (which traverses passage chamber 4) from coming into contact with the metal conduction layer 11 itself, in order to prevent the deterioration of the latter, e.g. via oxidation and/or corrosion.

In this manner, advantageously, the second impermeable layer of graphite 13 sealingly isolates the metal conduction layer 11 (and in particular the second contact surface 11B of the latter) from the fluid F1 which traverses the passage chamber 4.

Advantageously, the second impermeable layer of graphite 13 is extended over the entire corresponding side of the passage chamber 4 and is interposed between the second contact surface 11B of the metal conduction layer 11 and the passage chamber 4, in order to separate the metal conduction layer 11 from the first fluid flow F1 that traverses the passage chamber 4 itself.

Advantageously, the metal conduction layer 11 of each electrode layer 10 is compressed at its opposite first and second contact surface 11A, 11B in a balanced manner, balanced by the opposite pressures exerted by the first and second dry surfaces 12B, 13B of the two impermeable layers of graphite 12, 13.

In any case, i.e. both in the case of electrodes 10 comprising a single impermeable layer of graphite 12, and in the case of electrodes comprising a double impermeable layer of graphite 12, 13, the pressure exerted by the fluid (or by the fluids) on the electrodes 10 and which travels through the passage chamber 4 or the plurality of passage chambers 4 is balanced by the reaction exerted by the retention elements 3. In the case of a plurality of electrode layers 10, each comprising two impermeable layers of graphite 12, 13 with a metal conduction layer 11 interposed, the pressure of the fluid on the metal conduction layers 11 of the intermediate electrodes is balanced by the opposite actions of the hydraulic pressure exerted thereon through the opposite impermeable layers of graphite 12, 13 while the pressures at the ends of the succession of electrode layers 10 are balanced by the retention elements 3.

If two end electrodes are not provided at the ends of the succession of electrodes 10, but rather two walls are provided delimiting two terminal fluid passage chambers 4, then in this case the same chambers with their fluid and the terminal walls will act as retention elements in order to balance the pressures.

The aforesaid retention elements 3 can in particular comprise one or more tie rods acting directly or indirectly on the end electrodes 10 of the succession of electrodes 10, in order to compact such succession of electrodes 10 together.

In the case of the embodiment of FIG. 2, between each electrode and the next one, two spacer layers 110, 110' are interposed, made of rigid material such as plastic; such spacer layers 110, 110' abut against each other when the tie rods are driven, ensuring an optimal and precise distance between the electrodes 10. A seal 9 is preferably interposed between such spacers.

Between the electrode layers 10, spacer layers 40 are advantageously interposed in the passage chambers 4; such spacer layers 40 can in turn be constituted by highly porous, non-conductive materials.

The supply and outlet ducts for the fluid have been respectively indicated with 6 and 7.

Figure 6:
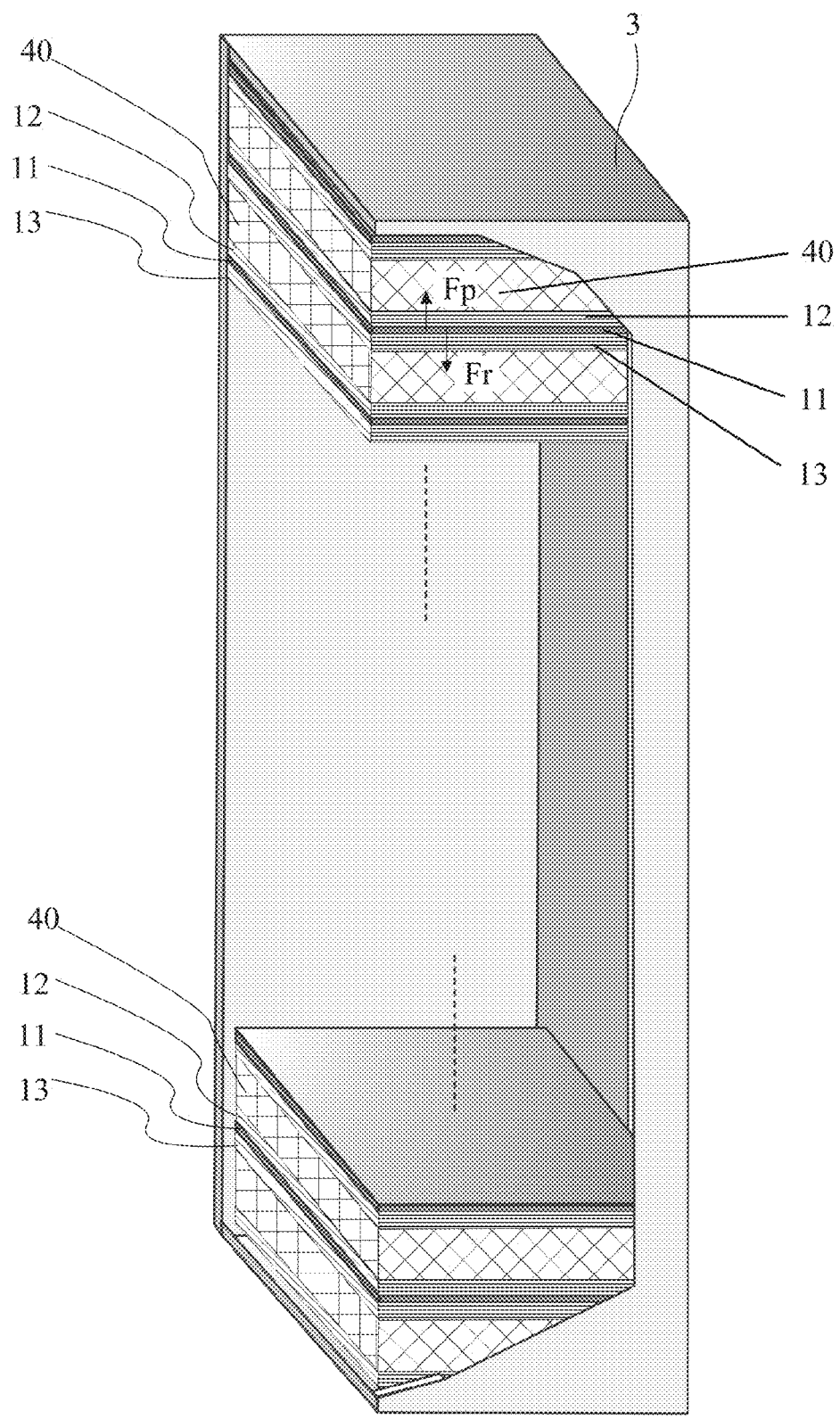
FIG. 6 shows an exemplifying view of a cross section of the apparatus of the scheme of FIG. 5 according to the present invention.
Figure 7:
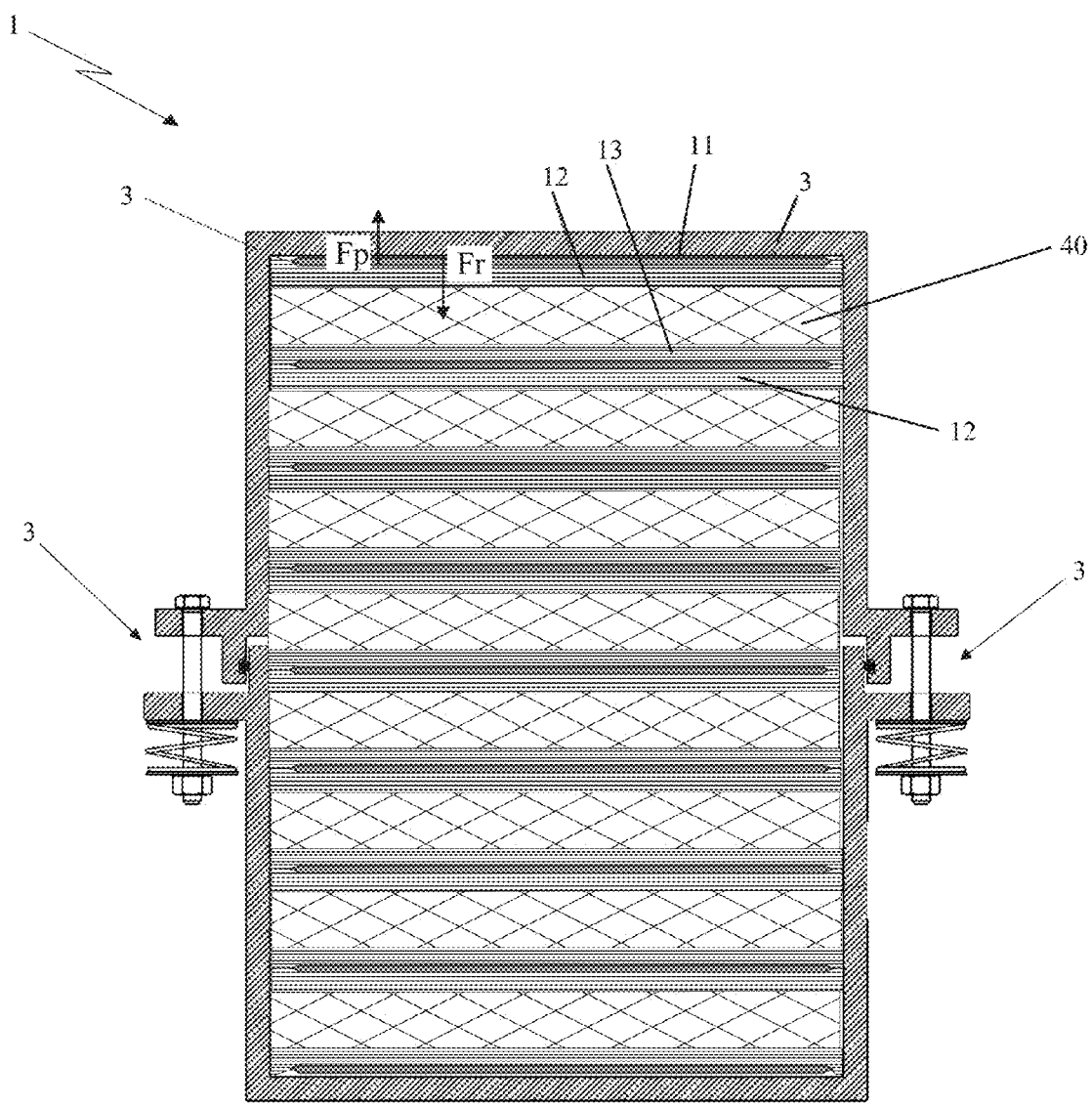
FIG. 7 shows an exemplifying sectional view of the apparatus of the scheme of FIG. 5 according to the present invention.
Figure 8A:
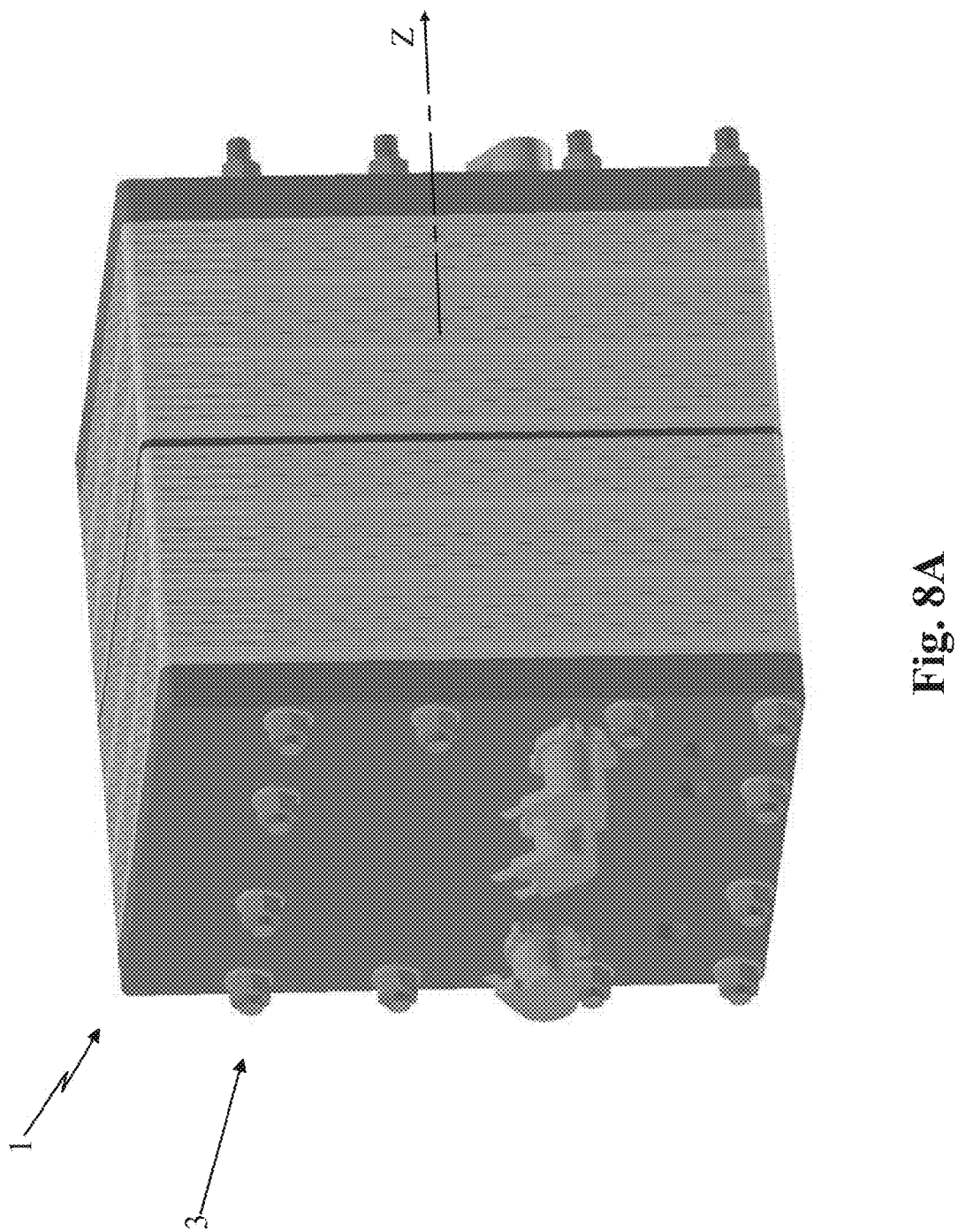
FIG. 8A schematically shows an overall view of an embodiment of an apparatus for treating a fluid, object of the present invention, in particular employing a plurality of cells with flow-through capacitors.
Figure 8B:
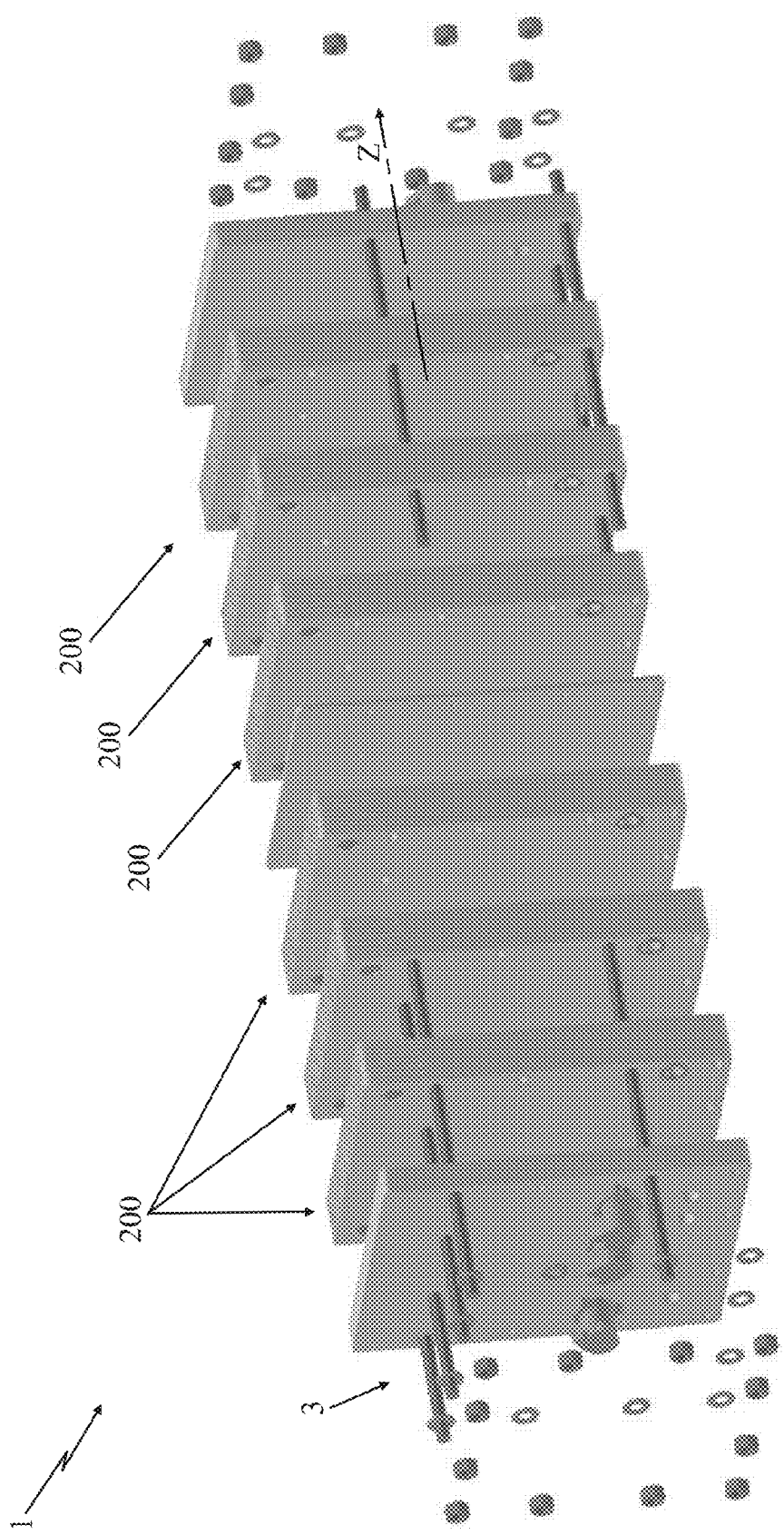
FIG. 8B shows the apparatus of FIG. 8A with several parts in exploded view, in particular with base modules side-by-side each other.
Figure 10:
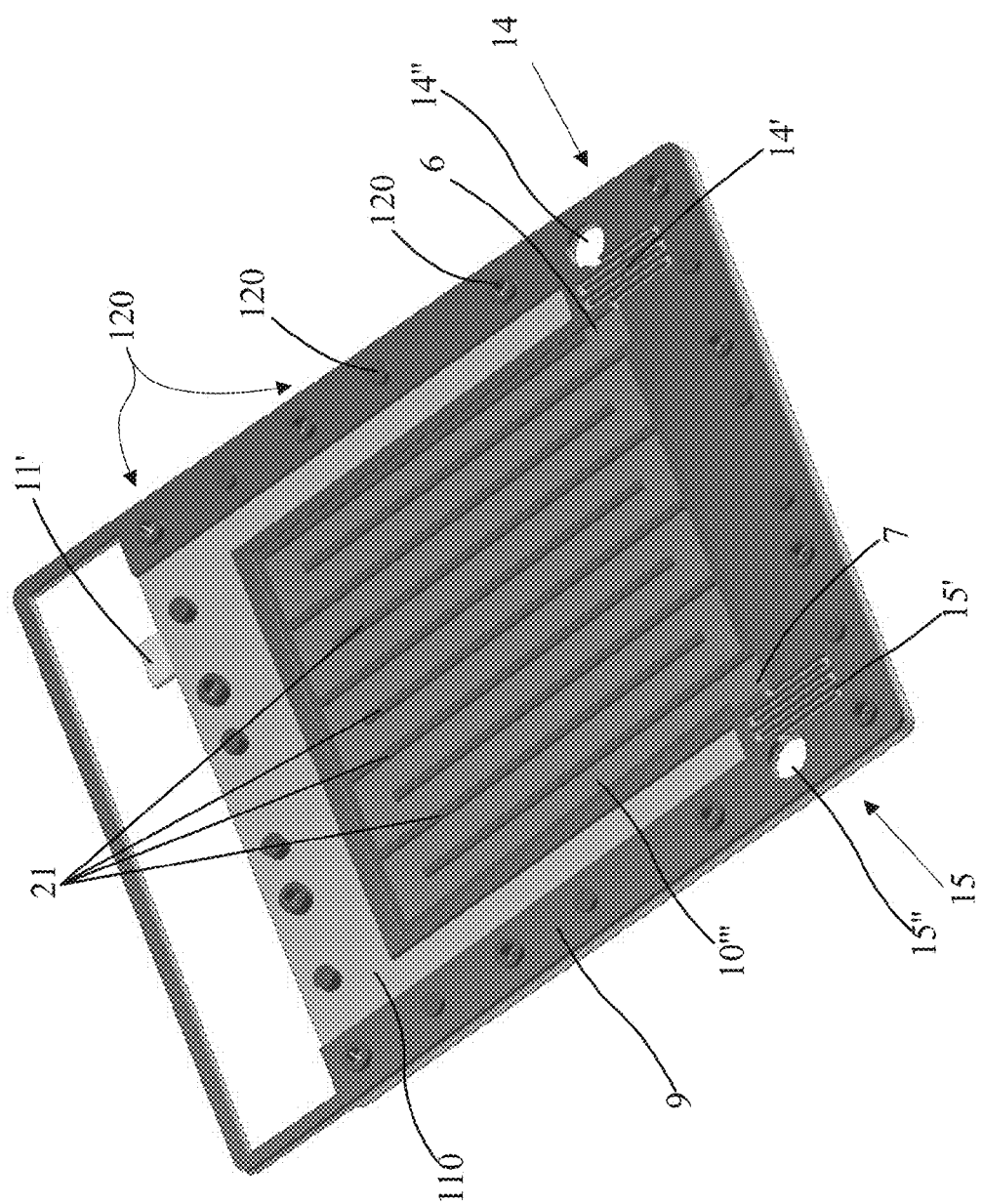
FIG. 10 schematically shows an assembled half-cell of the apparatus of FIG. 1 according to an internal view of the cell.
Figure 11:
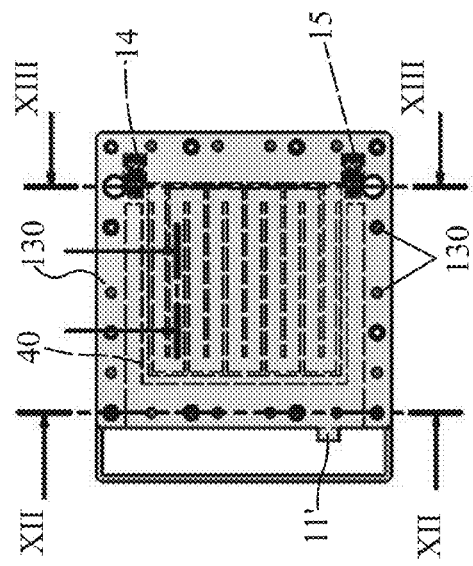
FIG. 11 schematically shows a plan view of a cell of the first apparatus embodiment.
Figure 12:
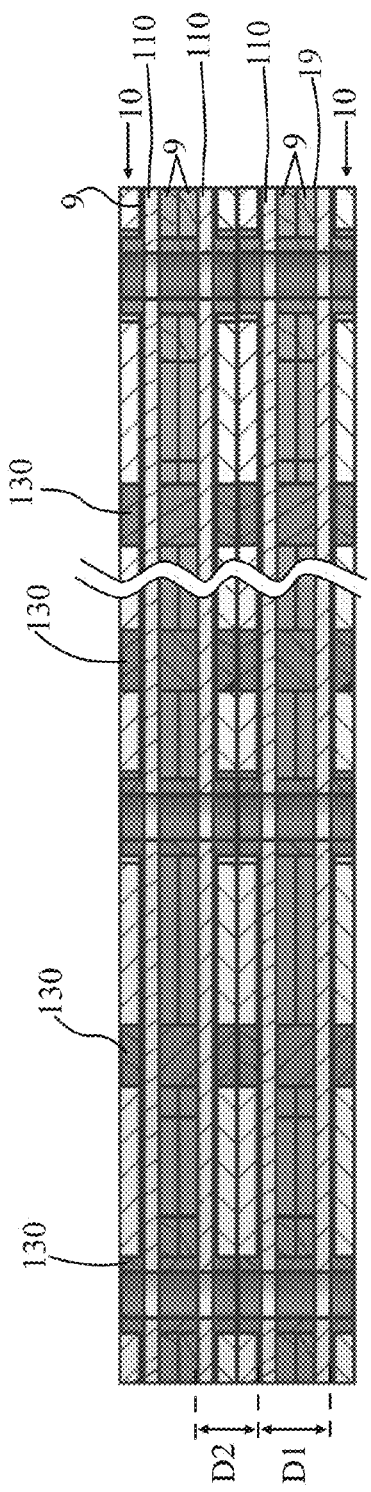
FIG. 12 schematically shows a sectional view made along the line XII-XII of the half-cell of FIG. 11 in which the thicknesses have been increased with respect to the other dimensions in order to facilitate comprehension, and at which the section of an equivalent cell has been superimposed.
Figure 15A:
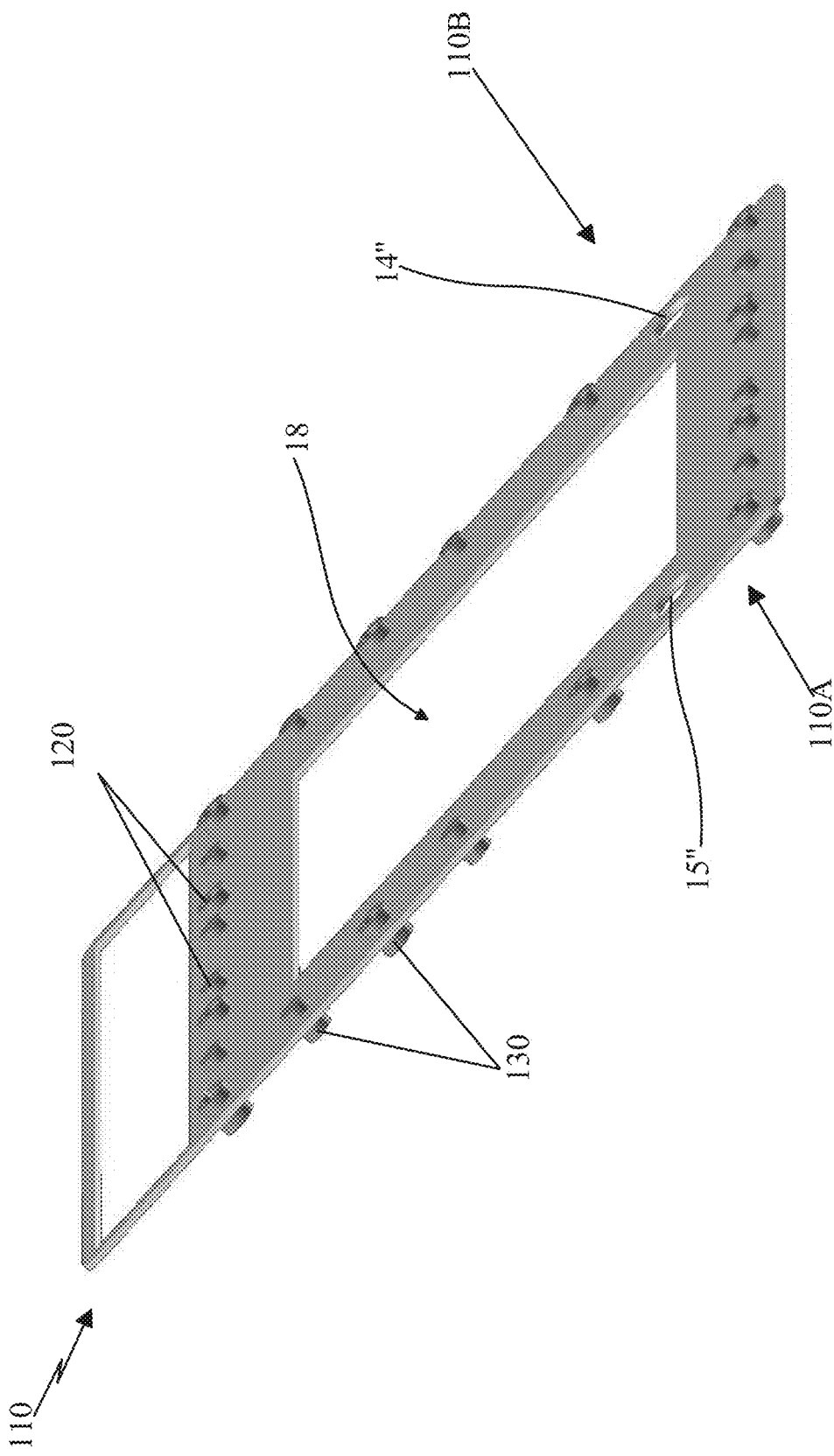
FIG. 15A shows a detail of the cell of the apparatus of FIG. 8 relative to a support layer in a first embodiment.
Figure 15B:
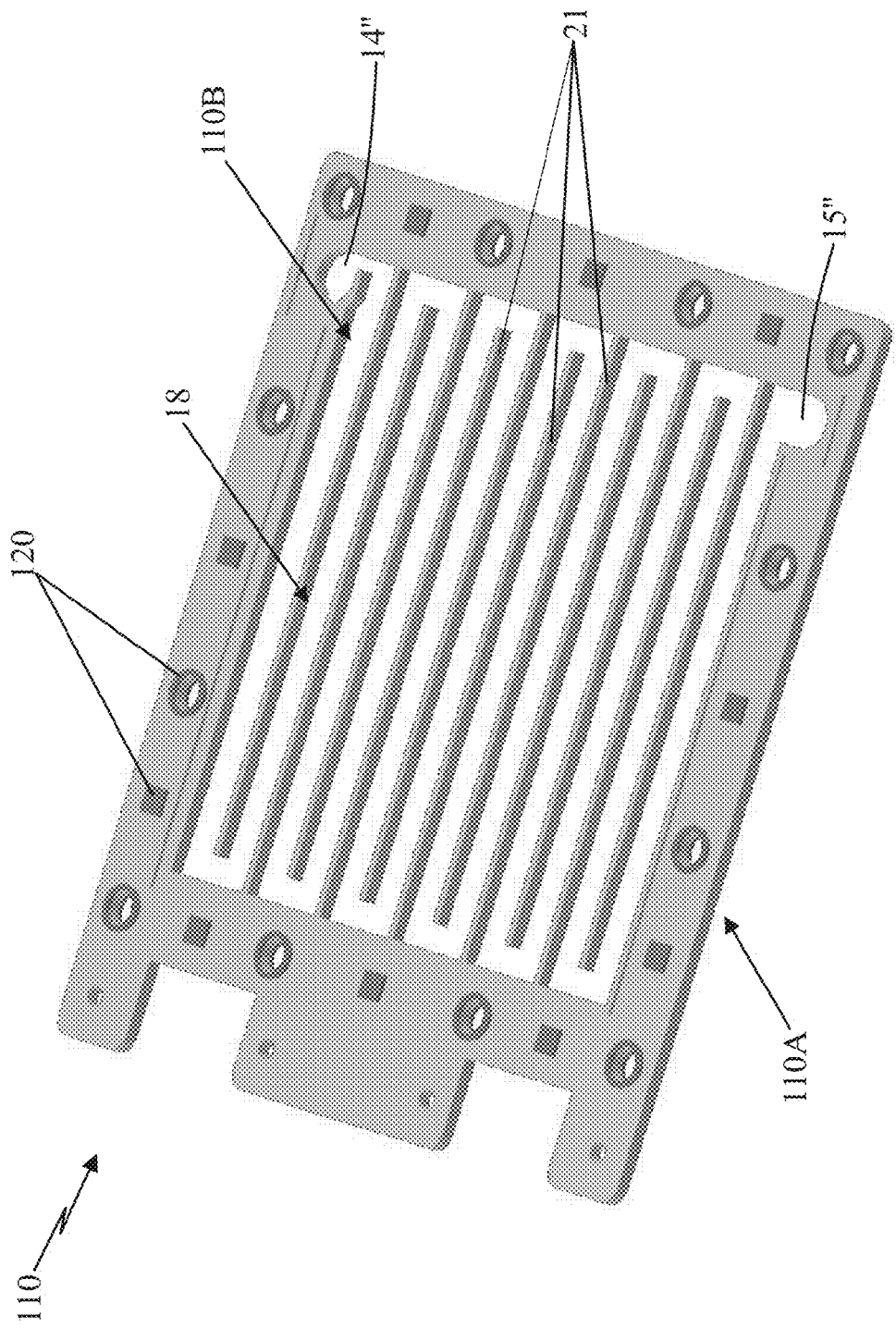
FIG. 15B shows a detail of the cell of the apparatus of FIG. 8 relative to a support layer in a second embodiment.
Figure 17:
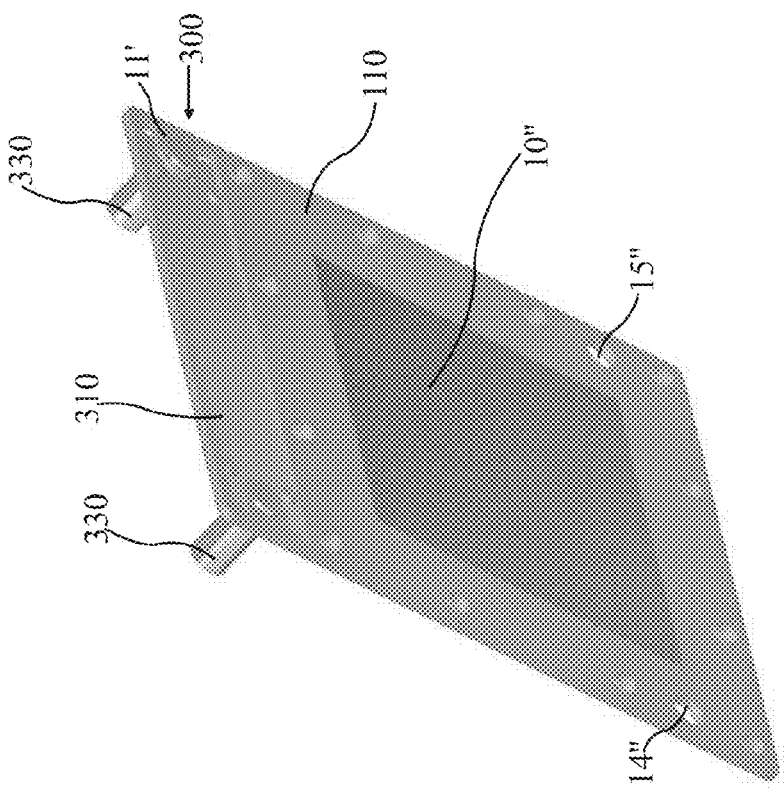
FIG. 17 shows a detail of the module of FIG. 16 relative to a support layer with the aforesaid electronic control means mounted thereon.
Figure 16:
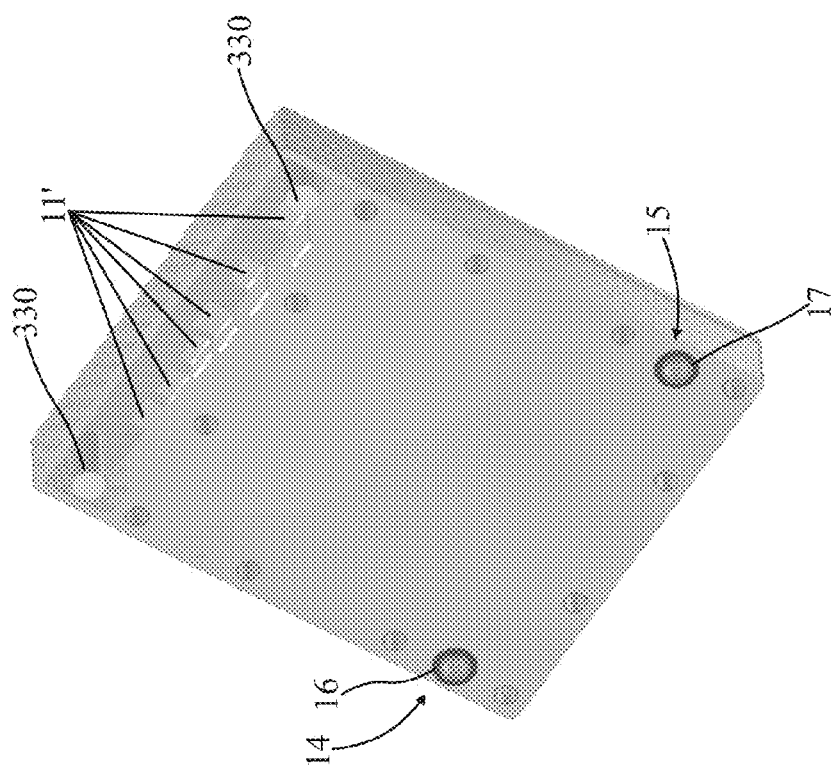
FIG. 16 shows a detail of the cell of the apparatus of FIG. 8 relative to a module of multiple cells assembled together with a cover removed in order to view electronic control means contained inside the aforesaid module.

The retention elements 3 can also be obtained with a rigid containment body, for example made of plastic, capable of retaining the at least one pair of electrodes and advantageously the succession of electrodes 10 compacted together, as is exemplified for example in FIGS. 1 and 6.

The apparatus configuration with a plurality of electrodes 10 in succession can be obtained with a production process that is extremely simple, with limited costs, and at the same time allows conveying high current to the facing electrodes without having to limit the maximum surface area of the electrodes, as in the case of electrodes directly power-supplied by means of the graphite itself. Indeed, the power supply is connected to superimposed terminals of a plurality of metal conduction layers 11 of the electrode layers 10 without the limitations of transverse conductivity of the graphite limiting the maximum applicable current.

The power supply supplies current to the metal conduction layers 11, e.g. to tabs 11' projecting outside the metal conduction layers 11. The latter in turn distribute the received current, with entirely negligible losses, to the impermeable layers of graphite 12, 13 with which they are in electrical contact due to the adherence imposed by the hydraulic pressure. Indeed, the metal conduction layers are selected with isotropic electrical characteristics and with low electrical resistance, and as stated they can be advantageously obtained at very low costs with a thin aluminum sheet.

All the metal conduction layers of a corresponding polarity have superimposed projecting tabs 11' in order to receive the current of corresponding polarity, e.g. by means of terminals.

The superimposition of the tabs 11' allows an optimal distribution of the current to all the impermeable layers of graphite 12, 13, with no particular voltage drop being made between each layer of the tabs 11'.

As is known, graphite offers optimal characteristics of resistance to corrosive agents, more generally oxidizing agents and hence the impermeable graphite layers 12, 13 are susceptible of coming into contact with the fluid to be treated without particular drawbacks.

Otherwise, the metal conduction layer 11, e.g. advantageously made of aluminum, is prone to oxidation and corrosion and hence its mechanical and electrical characteristics are susceptible of deteriorating over time; therefore, it is necessary to protect the contact thereof with the fluid (or with the fluids) to be treated.

For such purpose, advantageously, each impermeable layer of graphite 12, 13 and the opposite metal conduction layer 11 of each electrode layer 10 can be perimetrically sealed together by provided sealing elements 140, in order to prevent the fluid from penetrating in contact with the surface of the metal conduction layer 11.

Such sealing elements 140 are necessary, in accordance with the embodiments of the enclosed FIGS. 1, 3, 6 and 7, i.e. if it is provided that the electrodes are immersed inside a closed containment body intended to be traversed by the fluid (or by the fluids) to be treated. If instead the impermeable layers of graphite 12, 13 are sealingly compressed against the metal conduction layer 11, e.g. by support layers 110, 110' (as in the embodiments of FIGS. 2 and 8-17), ensuring that the same metal conduction layer 11 (e.g. aluminum) remains dry due to the sealing action of the same graphite, possibly assisted by an impregnation, then the sealing elements 140 can even be omitted.

Such sealing elements 140 can for example comprise a perimeter cord of glue (see for example FIG. 3), or a perimeter deformation (e.g. a band) which engages the impermeable layer of graphite (or the two impermeable layers of graphite 12, 13) with the opposite metal conduction layer 11.

In the preferable and more frequent case in which each electrode 10 comprises two impermeable layers of graphite 12, 13 with the metal conduction layer 11 interposed, then the same electrode will be substantially made in the form of a bag with the first and the second impermeable layer of graphite 12, 13 defining a closed envelope containing the metal conduction layer 11.

The impermeable layers of graphite 12, 13 preferably have thin thickness, i.e. substantially comprised between 0.05 mm and 1.5 mm, in a manner so as to ensure a considerable flexibility thereof.

In particular, the physical structure of graphite is composed of sheets superimposed on each other and therefore, based on the thickness and density, it becomes more or less impermeable to liquids.

Advantageously, in order to improve the impermeability of the thin graphite layers, it is advisable to carry out a treatment of impregnation of the graphite with a waterproofing product, or in particular with a polymer product capable of waterproofing graphite and, for example, constituted by a silicon rubber, in particular with low viscosity, or by a polymer of different type such as of acrylic, epoxy or another type, the selection of the specific polymer not binding with regard to the idea underlying the present invention.

Hence, the impregnation of the graphite can be advantageously attained in many different ways, such as for example by means of a slow cross-linking polymer which is extended on the surface of the graphite itself and which penetrates in a natural manner or possibly assisted by a pressure difference (partial vacuum on the opposite side). This impregnation can be attained for example with a "roll to roll" system, where a perforated cylinder with a suction conveys the graphite sheet in contact with a tray containing the polymer in liquid form. The polymer penetrates, leaving the surface dry and maintaining the electrical conductivity of the layer.

Advantageously, in particular given the characteristic structure of graphite, the impermeable layer of graphite 12, 13 can be impregnated with an oil having high viscosity, such as a silicone oil with high molecular weight. This oil, during the impregnation treatment, will be absorbed by the graphite itself, creating a water-repellent barrier.

In substance, the impermeable layer of graphite 12, 13 is advantageously impregnated with at least one waterproofing material, and in particular is impregnated with at least one waterproofing polymer.

In accordance with a first embodiment, the impermeable layer of graphite 12, 13 is impregnated with waterproofing material, but superficially it is not continuously covered by a layer of the waterproofing material itself in particular at the dry surface 12B, 13B of the impermeable layer of graphite 12, 13. In this manner, the waterproofing material does not completely cover the dry surface 12B, 13B of the impermeable layer of graphite 12, 13 and, therefore, the graphite of the impermeable layer 12, 13 is in electrical contact with the corresponding contact surface 11A, 11B of the metal conduction layer 11, in order to ensure the distribution of the electric current from the metal conduction layer 11 to the impermeable layer of graphite 12, 13.

In accordance with a second embodiment, the impermeable layer of graphite 12, 13 is impregnated with waterproofing material which forms a layer of waterproofing material that completely covers the dry surface 12B, 13B of the impermeable layer of graphite 12, 13, in this case the waterproofing material being electrically conductive for the purpose of allowing the distribution of the electric current from the metal conduction layer 11 to the impermeable layer of graphite 12, 13.

More in detail, for example, the layer of the waterproofing material can be obtained by mixing a conductive material (such as graphite powder, carbon black, carbon nanotubes or carbon nanofibers, conductive particles, both metal and polymer conductive particles) with one of the previously-described waterproofing polymers. In this manner, from the graphite impregnation process, the waterproofing material layer is created which is placed to completely cover the dry surface 12B, 13B of the impermeable layer of graphite 12, 13, and is at the same time capable of conducting the electric current.

Each impermeable layer of graphite 12, 13 of each electrode 10 can be, in accordance with the specific application, directly in contact with a fluid with its wet surface 12A, 13A (whether it is as specified hereinbelow, represented by the fluid to be treated or a washing fluid, a slurry or still another fluid, as a function of the specific configuration of the apparatus 1) or covered by a layer for example of spongy carbon in order to increase the wet surface and better trap the charged particles. Furthermore, each impermeable layer of graphite 12, 13, alternatively or in addition to the coating of the carbon layer, can also have union-selective membrane.

Figure 5:
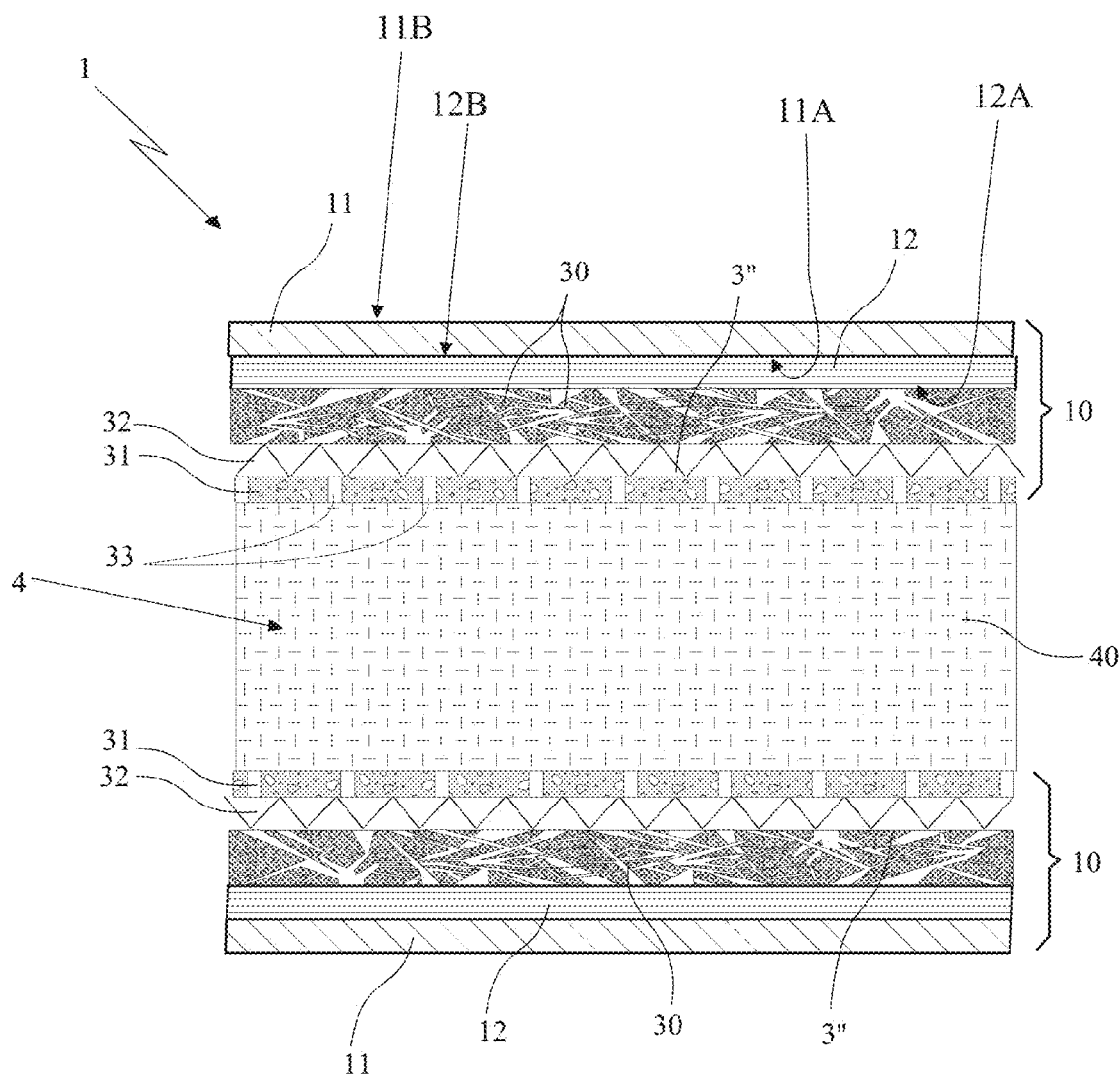
FIG. 5 schematically shows a section and partial view of one embodiment of an apparatus according to the invention, of capacitive deionization type for the purification of a fluid.

In the embodiment illustrated in the enclosed FIGS. 5 and 6, the apparatus is intended for the purification of a fluid and for such purpose comprises a flow-through capacitor formed, in a per se known manner, by a plurality of electrode layers 10 electrically connected, by means of suitable manifolds (not shown), to a direct current DC power supply. The latter charges the contiguous electrode layers 10 to different polarities in a manner so as to define a plurality of pairs of facing electrodes which form the armatures of the same number of capacitors in series with each other, between which the electric fields are established.

The operating cycle of the apparatus in this case provides for, in a per se conventional manner and well-known to the man skilled in the art, a charging step, in which the power supply charges the contiguous electrodes 10 to different polarities in order to bring them to an operating voltage, equal for example to 1.6 V. For such purpose, the power supply supplies current to the metal conduction layers 11, which distribute it to the impermeable layers of graphite 12, 13. For this purpose, the metal conduction layers have, as stated, projecting tabs 11'. The projecting tabs 11' of corresponding polarity are superimposed on each other in order to receive the corresponding charging current.

The cycle then provides for an operating step, in which, with the electrodes 10 charged, the flow of fluid to be treated is forced to pass through the capacitor, by means of the feed duct and the extraction duct. During such operating step, the polarized particles are removed from the fluid due to the fact that the ionized particles are attracted by the respective electrodes 10 with polarity opposite thereto, determining a progressive accumulation of the same ionized particles on the same electrodes 10.

Once the programmed saturation of the electrodes 10 with the polarized particles present in the fluid has been reached, the cycle provides for a step of regeneration, in which with the electrodes 10 deactivated, a flow of discharge fluid, preferably containing a solubilizing product, is forced to pass into the capacitor with consequent removal of the ionized particles accumulated on the electrodes 10.

The electrode layers 10 are charged for example to a voltage of 1.6 Volt and provide that the impermeable layers of graphite 12, 13 are covered on their first and second wet surface 12A, 13A with a material with porous structure, such as active carbon 30, i.e. having a spongy formation with surface interstitial pores that offer a considerable surface area of exchange with the liquid. Each impermeable layer of graphite 12, 13 can be constituted by any one of the materials described for example in the U.S. Pat. No. 6,413,409 enclosed herein for reference purposes from line 64 of column 3 to line 41 of column 4, or by flexible conductive sheets of PTFE and carbon particles as described in the U.S. Pat. No. 7,175,783 enclosed herein for reference, or by any material described in the U.S. Pat. No. 6,709,560, enclosed herein for reference, from line 26 of column 6 to line 23 of column 7.

Between the electrode layers 10, spacer layers 40 are advantageously interposed in the passage chambers 4; such spacer layers 40 can in turn be constituted for example by highly porous non-conductive materials, capable of isolating the electrodes 10, allowing the passage of the fluid flow, such as a porous synthetic material or other non-conductive materials such as glass fiber or nylon fabric.

The electrode layers 10 can also comprise a semi-permeable ion exchange material layer 31, which can be associated in various ways with the first wet surface 12A, 13A of the impermeable layers of graphite 12, 13 or preferably with the surface of the active carbon layer. It can also be separated by means of a spacer 32 by the surface of the active carbon 30 (or directly by the impermeable layer of graphite 12, 13).

The semi-permeable material layer 31 is adapted to selectively trap the ions that migrate towards the electrodes 10 under the action of the field, during an operating step better described hereinbelow, allowing the improvement of the capacitor performances, i.e. retaining a greater quantity of charged particles in the aforesaid operating step. The latter are then at least partly released from the electrodes 10 during the subsequent regeneration step, in particular passing through provided holes 33 made in the semi-permeable material layer 31.

In FIG. 5, the scheme of a pair of electrodes 10 has been illustrated for an apparatus with flow-through capacitors. Of course, as explained above, the electrode layers 10 will be preferably repeated in sequence, and metal conduction layers 11 will be provided that are covered on both surfaces by impermeable layers of graphite 12, 13; in FIG. 5, only two electrodes 10 provided with a single impermeable layer of graphite 12 are illustrated for exemplifying purposes.

In FIG. 6, the active carbon layers and semi-permeable material layers were not illustrated in order to facilitate comprehension.

The retention elements 3, mentioned above, are obtained in the above-illustrated case by a containment structure, constituted by a box-like body made of plastic material, within which the plurality of electrode layers 10 and of spacer layers 40 are housed under compression.

FIGS. 8-17 illustrate in greater detail an apparatus for purifying a fluid of the type with flow-through capacitors as in the preceding case but with the single layers stacked on each other, without requiring a closed containment structure.

With reference to the aforesaid figures, each passage chamber 4 is delimited by the electrode layers 10, each obtained with a metal conduction layer 11 interposed between two impermeable layers of graphite 12 and 13.

Each chamber 4 is provided with at least one inlet opening 6 and with at least one outlet opening 7 for the passage of the fluid F1.

Each passage chamber 4 also comprises sealing means 9, perimetrically arranged around each chamber in order to seal it with fluid seal.

Two support layers 110, 110' are also present for each passage chamber, each support layer mechanically associated with one of the two electrode layers 10 of a passage chamber 4; for example, as explained hereinbelow, each electrode layer being fixed via gluing to a corresponding support layer 110, 110'.

Preferably, such support layers 110, 110' are made of a plastic material sufficiently rigid for supporting the other layers mechanically connected thereto and for perimetrically supporting the hydraulic pressure of the fluid contained inside the chamber 4.

First and second spacer means 120, 130 are provided, of which the first spacer means 120 are interposed between the two support layers 110, 110' of each passage chamber 4, in a manner so as to separate, with a first compression end stop distance, the two electrode layers 10 of the chamber 4 and thus in a manner so as to limit the maximum compression to which the sealing means 9, 9' are subjected (whose compression depends on the distance between the two electrode layers 10), such sealing means 9, 9' being interposed between the two support layers 110, 110' fixed to the two electrode layers 10 as in the embodiment indicated in the enclosed FIGS. 8-17 and/or such sealing means 9, 9' being directly fixed to the two electrode layers 10, thus defining the actual opening of the chamber 4.

The second spacer means 130 are interposed between the support layers 110, 110' of two contiguous passage chambers 4 in the stack, forcing them to be at a second compression end stop distance D2 which places in contact the outermost layers of the two contiguous chambers 4, limiting however the compression of one on the other to a value predefined by said distance D2.

The retention elements 3 compress the passage chambers 4 on each other with assembly compression limited by the second spacer means 130, which arrange the contiguous passage chambers 4 in contact with each other at a predefined pressure dependent on the aforesaid second minimum compression end stop distance D2 of the two support layers 110, 110'.

Advantageously, the first sealing means 9, 9' comprise at least one seal, which is subjected to compression by the action of the two support layers 110, 110' of each passage chambers 4 in order to exert its function of sealing the chamber 4. Such two support layers 110, 110' are arranged compressed by arranging the electrode layers 10 at the first compression end stop distance D1, in order to define a maximum pre-established compression on the seal 9.

Indeed, during the assembly of the stack of treatment cells 2, once the abutment condition of the first spacer means 120 has been attained, the two support layers 110, 110' of each passage chamber 4 cannot further approach each other and the seal 9, 9', interposed between the electrode layers 10 for the seal of the passage chamber 10 delimited thereby, cannot be compressed beyond that provided in the design for such first compression end stop distance D1.

The seal 9, 9' (at least one) is interposed between the electrode layers 10 of each chamber 4 in order to hermetically seal it. For such purpose, such seal 9, 9' can be arranged adherent to the two electrode layers 10 in order to peripherally seal the chamber 4 or it can be, additionally or alternatively, fixed on the two support layers 110, 110' (as in the embodiment of the enclosed FIGS. 8-17) if electrode layer 10, as better specified below, is advantageously adherent on the support layer 110, 110' (e.g. by means of gluing).

Preferably, two seals 9, 9' will be provided, each of which fixed to an electrode layer 10 of the pair of layers which delimits the at least one chamber 4 and/or, to the support layers 110, 110' bearing the electrode layers 10 fixed thereto, in accordance with the abovementioned embodiment having the electrode layers 10 adherent to the support layers 110, 110'.

In any case, with the term interposition it must be intended that the sealing means 9, 9' or the seals are comprised within the position of the planes of the support layers 110, 110', and they can also be more external peripherally with respect to the two electrode layers 10.

The inlet 6 and outlet 7 openings of the contiguous passage chambers 4 are respectively connected with each other by means of feed connections 14 and discharge connections 15 with the interposition of respective second sealing means 16 and third sealing means 17.

Such seals can be made directly by the impermeable layer of graphite 12 and hence the aforesaid second sealing means 16 and third sealing means 17 can be omitted.

Such second sealing means 16 are compressed in the aforesaid second compression end stop distance D2 defined by the abutment of the second spacer means 130 which separate the contiguous cells 2 in a precise manner.

Advantageously, the feed connections and discharge connection are obtained with channels 14', 15' made in the same seals as indicated in FIG. 3, which are in communication with through holes 14", 15" obtained on the support layers which hence are sealed on the contiguous chamber 4 by means of the interposition of the aforesaid respective second sealing means and third sealing means. The latter can be made in the form of rigid or elastic seals or they can be obtained by means of a shaped portion of the same impermeable layer of graphite 12, 13 of the electrode layer 10, suitably shaped with projecting seal lip.

Therefore, the sealing means, i.e. also the layers that form the passage chambers 4, will be compressed, packed together, by the action exerted by the retention elements 3, such action nevertheless being limited by the compressibility of the sealing means or also by the compressibility of the layers that constitute the chambers 4, within the second compression end stop distance D2. The further compression force exerted by the retention elements 3 is in fact counterbalanced by the reaction of the second spacer means 130 of the contiguous passage chambers 4 which are in abutment against each other, preventing their approaching (and hence their further compression) beyond the distance D2.

Advantageously, the fluid contained in the apparatus 1 is substantially equal to the liquid contained in the chambers 4, given that manifold volumes for liquid feed and discharge are not provided.

Advantageously, at least one of the support layers 110, 110' of the passage chamber 4, and preferably both the support layers 110, 110', has a through window 18, which for example has square form and delimits a perimeter frame on whose two faces the first and second spacer means 120, 130. In addition, such support layer 110, 110' bears, fixed on the external face 110A, 110'A, i.e. the face directed in the direction opposite that of the chamber 4, the electrode layer 10 arranged to close the aforesaid through window 18, while it bears fixed on the internal face 110B, 110'B, i.e. the face directed in the direction of the chamber 4, the sealing means 9 i.e., as stated, in the form of a seal.

Preferably, in accordance for example with FIGS. 8-17, the impermeable layer of graphite 12, 13 of the electrode layer 10 is fixed to the external face 110A, 110'A of the corresponding support layer 110, 110' by means of a glue layer 19.

In turn, each seal 9, 9' is preferably fixed to the internal face 110B, 110'B of the corresponding support layer 110, 110' by means of screen printing, forming by molding or 31) printing with print heads with release of material layers.

The second spacer means 130 are for example obtained in the form of one or more elements 130' projecting from the external face 110A, 110'A of the corresponding support layer 110, 110'. In particular, they are for example obtained in the form of columns integral with the corresponding support layer 110, 110'. Otherwise such second spacer means 130 can be obtained in the form of a perimeter cord in relief projecting from the external face 110A, 110'A of the corresponding support layer 110, 110', preferably also extended in proximity to the action area of the tie rods of the retention elements.

In order to facilitate the assembly of the passage chambers 4 in the stack that forms the apparatus 1, it can be provided that such second spacer means 130 are obtained on the support layers 110, 110' of contiguous chambers 4 in a complementary manner, for example of male/female type in particular for facilitating the centering of the elements during the assembly of the stack.

Preferably such projecting elements 130' will be extended in relief from the external face 110A, 110'A of the frames of the corresponding support layers 110, 110' obtained around the through window 18, by traversing the holes obtained on the electrode layer 10 which, as indicated above, can be advantageously glued on the same external face 110A, 110'A of the support layer 110, 110'.

Such second spacer means 130 can also be provided only on one of the two support layers 110, 110', the other being provided with external face 110A, 110'A substantially flat and only adapted to receive in abutment the second spacer means 130 associated with the support layer 110, 110' of the other contiguous chamber 4.

Advantageously, the projecting elements 130' can be made in the form of hollow bushings, integral with the corresponding support layer 110, 110', adapted to receive inside the through hole thereof the tie rods of the retention elements 3.

The second spacer means 130 can also be provided at the inlet and outlet openings of the chambers 4 and in this case they will be advantageously in the form of tubular elements within which the fluid to be treated will pass to and from the chambers 4.

The first spacer means 120 are also obtained analogous to the second spacer means 130, for example in the form of one or more elements 120' projecting from the internal face 110B, 110'B of the corresponding support layer 110, 110'. In particular they are for example obtained in the form of columns integral with the corresponding support layer 110, 110'. Otherwise, such first spacer means 120 can be obtained in the form of a perimeter cord in relief projecting from the internal face 110B, 110'B of the corresponding support layer 110, 110'. In order to facilitate the assembly of the single passage chambers 4 in the form of closed bodies with hermetic fluid seal, it may be provided that such first spacer means 120 are obtained on the opposite internal faces 110B, 110'B of the support layers 110, 110' in a complementary manner, for example of male/female type in order to facilitate the assembly of the cells themselves.

Preferably such projecting elements 120' will be extended in relief from the internal face 110B, 110'B of the frames of the corresponding support layers 110, 110' obtained around the through window 18, by traversing the holes obtained on the seal layer 9 which, as indicated above, can be advantageously obtained on the internal face 110B, 110'B of the support layer 110, 110' (e.g. fixed via gluing or obtained via screen printing).

Such first spacer means 120 can also be provided only on one of the two support layers 110, 110', the other being provided with internal face 110B, 110'B substantially flat and only adapted to receive in abutment the first spacer means 120 associated with the facing support layer 110, 110'.

Advantageously, the projecting elements 120' can be made in the form of hollow bushings integral with the corresponding support layer 110, 110', as a continuation of the bushings obtained on the external face 110A, 110'A in order to receive within the through hole thereof the tie rods of the retention elements 3.

The above-described chambers 4 can be assembled together with groups of cells for the purpose of obtaining base modules 200 that can be easily managed in order to be combined together in the formation of apparatuses with performances adaptable as a function of the application specifications.

More in detail, such base modules 200 will provide terminal closure covers 110, 110' arranged to cover the entire surface of the respective terminal electrode layers 10.

Such modules will each internally have electronic control means 300 for controlling the power supply of the single chambers 4. For example, in the case of apparatus with flow-through capacitors, the electronic control means 300 will provide for the optimal distribution of the current to the electrodes of the single chambers 4 as well as, for example, the reversal of polarity during regeneration in order to allow the attainment of its operating cycle.

More in detail, the electronic control means 300 comprise at least one board 310 mechanically fixed to a support layer 110, 110' in particular at a through opening 32 thereof, and two terminals 330 electrically connected to said board 310 in order to power supply it. The aforesaid board 310 is in turn electrically connected to the single electrode layers 10 by means of single tabs 11' provided on the metal conduction layers 11.

The terminals 330 are electrically connectable to an electrical power supply source, not shown, in a per se entirely conventional manner and for this reason not illustrated in detail.

Advantageously, the terminals 330 are projectingly extended from the board 310 into an externally accessible area in order to be electrically connected to the power supply. In accordance with the embodiment reported in FIG. 9, they are extended parallel to the extension of the stack of passage chambers 4, being inserted in aligned openings made on the different superimposed layers.

Advantageously, the aforesaid electronic control means 300 are perimetrically bounded on one face of a support layer 110, 110' (in particular on the internal face 110B, 110'B) by the seal 9, in a manner so as to be electrically and hydraulically isolated from the chamber 4 where the fluid flows.

The direct connection that exists between the electrodes and the electronic control means 300 eliminates the need for costly wiring for high currents outside chamber 4, simplifying the apparatus and reducing costs.

In the embodiment illustrated in the enclosed FIGS. 8-17, the passage chamber 4 is of the type intended to form a flow-through capacitor provided, in a per se known manner, with a pair of electrode layers that are electrically connected, by means of suitable manifolds (not shown), to a power supply (usually DC with direct current). The latter charges the contiguous electrode layers 10 to different polarities (e.g. at a voltage of 1.6 Volt) in a manner so as to define an electric field therebetween.

Each electrode layer 10 also comprises a material layer with porous structure, i.e. with a formation of surface interstitial pores that offer a considerable surface area of exchange with the liquid, placed to cover the wet surface of the impermeable layer of graphite 12, 13.

The material that constitutes the layer with porous structure can be of any one material known to be employed in the electrochemical processes of flow capacitors and advantageously will comprise spongy active carbon, or it can be constituted by any one of the materials described for example in the U.S. Pat. No. 6,413,409 enclosed herein for reference from line 64 of column 3 to line 41 of column 4, or by flexible conductive sheets of PTFE and carbon particles as described in the U.S. Pat. No. 7,175,783 enclosed herein for reference, or by any material described in the U.S. Pat. No. 6,709,560, enclosed herein for reference, from line 26 of column 6 to line 23 of column 7.

Such porous conductor layer 10" is preferably provided only at the through window 18 of the electrode layer 10 and is obtained for example via screen printing, via gluing or with other known methods capable of obtaining equivalent results.

Advantageously, the porous layer 10" is in turn covered by a layer of semi-permeable ion exchange material 10''', it too also advantageously obtained via screen printing.

Such semi-permeable ion exchange material layer 10''' can be associated in various ways with the porous layer 10". More in detail, such ion exchange layer 10''' can be separated from the porous layer 10" or superimposed to cover it, it can be infiltrated in its pores or formed in the same layer of conductor material as is for example described in the U.S. Pat. No. 6,709,560 enclosed herein for reference, from line 27 of column 6 to line 10 of column 7, having analogous behavior to selective ion exchange, and hereinbelow referred to with the same semi-permeable ion exchange material layer terminology.

Such semi-permeable material layer 10''' can be obtained with a semi-permeable membrane, or with one or more material layers charged for example as described in the U.S. Pat. No. 6,709,560, enclosed herein for reference also from line 50 of column 4 to line 10 of column 7. The semi-permeable material layer 10''' is adapted to selectively trap the ions that migrate towards the electrode layers 10 under the action of the field during an operating step of the passage chambers 4 with flow-through capacitor better specified hereinbelow, allowing the improvement of the capacitor performances, i.e. allowing the retention, in the aforesaid operating step, of a greater quantity of charged particles. The latter are then at least partly released from the electrode layers 10 during the subsequent regeneration step, in particular for example passing through provided holes made in the semi-permeable material layer 10'''.

Advantageously, the electrode layers 10, and more particularly their ion exchange membrane substrates 10''' as illustrated in the enclosed figures, are separated from each other by at least one spacer layer 40 through which the fluid flow to be treated flows, for example containing the ionized particles whose at least partial removal is desired.

The spacer layer 40 can also be obtained in labyrinth form in order to determine a specific pathway of the fluid inside the chamber 4, for the purpose of optimizing the treatment thereof in the same chamber 4.

The spacer layer 40 can also be obtained via screen printing above the semi-permeable material layer 10''' or it can be obtained with a layer of highly porous non-conductive material, capable of isolating the electrodes and allowing the passage of the fluid flow, such as a porous synthetic material or other non-conductive materials, such as glass fiber or nylon fabric.

It is also possible to shape the ion-selective layer 10''' for example by means of embossing, for the purpose of obtaining a three-dimensional extension of the layer adapted to attain a channel of the fluid defining the spacer layer 40.

The spacer layer 40 can also be integrally obtained with the support layer shown in FIG. 5B. The two spacer layers 40 will define the opening of the chamber 4 in which the fluid to be treated F passes.

The passage chamber 4, illustrated in FIGS. 8-17, is definable of the type with flow-through capacitor, and is intended to be supplied during the operation of the purification apparatus in which it is integrated, together with a plurality of other chambers 4, with a flow of a first fluid by means of a feed duct. The fluid flow that traverses the capacitor of the chamber 4 is then conveyed at the outlet to an extraction duct. For such purpose, each chamber 4 is as specified above provided with an inlet opening and with an outlet opening joined to the corresponding openings of the other chambers 4, as described above.

The electrode layers 10 which form the flow-through capacitor of the chambers 4 are electrically connected to a power supply, in particular with direct current, provided with an integrated circuit control board, which controls—in the different operating steps of the operating cycle of the capacitor, typically by means of semiconductor switches—the voltage applied at the electrodes by means of suitable connection manifolds.

The operating cycle of the chamber 4 of the type with flow-through capacitor provides for, in a per se entirely conventional manner and well-known the man skilled in the art, a charging step, in which the power supply charges the contiguous electrode layers 10 to different polarities in order to bring them to a constant operating voltage, equal for example to 1.6 V. The cycle then provides for an operating step, in which, with the electrode layers 10 charged, the flow of fluid to be treated is forced to pass through the chamber 4, by means of the feed duct and the extraction duct. During such operating step, the polarized particles are removed from the fluid due to the fact that the ionized particles are attracted by the respective electrodes with polarity opposite thereto, determining a progressive accumulation of the same ionized particles on the same electrodes.

Once the programmed saturation of the electrodes with the polarized particles present in the fluid has been reached, the cycle provides for a step of regeneration, in which with the electrode layers 10 deactivated, a flow of discharge fluid is forced to pass into the capacitor with consequent removal of the ionized particles accumulated on the electrode layers 10.

Usually, the discharge flow that passes into the passage chambers 4 during the regeneration step is to be considered a discard (unless the object of the apparatus is that of concentrating a solution), and if this is an apparatus for the deionization of water, it will be sent to the provided normal drain of the hydraulic plant.

Before restarting the operating step, a pre-production step may also take place, in which the flow of fluid to be treated continues to be conveyed to the drain while awaiting the capacitor to reach the charge at the provided voltage, and hence the electrode layers 10 are fully efficient for their action of removing the ionized particles from the liquid.

With the term "deactivated" it is intended to indicate all those conditions to which the electrode layers 10,10' are subjected before restarting the charge step and which generally provide for a discharge step with short-circuiting of the electrode layers 10, a positive discharge step in which the electrode layers 10 are subjected to a voltage with reversed polarity, aimed to remove the charged particles from the electrode layers 10, where they have accumulated, and a no-voltage step before restarting the charge step.

The invention optimally meets the requirements of making the electrode 10 with at least two different layers, with a first electrically anisotropic layer, such as the metal conduction layer 11 in order to ensure an optimal current distribution (even high current) to all the superimposed electrode layers 10, and a second layer capable of resisting the chemical and oxidative stresses of the liquid to be treated, even provided with lower electrical performances (greater resistance, and in the case of graphite anisotropic behavior or poor conductivity in the transverse plane) and preferably with good hydraulic isolation capacities. For such purpose, graphite is at the moment the preferred material due to its high chemical inertia, especially after having undergone an impregnation treatment. Nevertheless, with the term graphite employed herein, also other materials must be expressly considered to be comprised which are chemically resistant to liquids and provided with good characteristics of electrical conductivity, such as intrinsically or extrinsically conductive polymers.

In the case of intrinsically conductive polymers, such as polyparaphenylene (PPP), polyparaphenylene sulphide (PPS), polyparaphenylene vinylene (PPV), polyaniline (PANI), polypyrrole (PPy), polythiophene (PT), polyisothianaphthene (PITN) and polyethylenedioxythiophene (PEDOT), their electrical conductivity relatively lower than that of graphite can be increased via doping and hence their use in the described apparatus can be possible in substitution of the graphite layer.

Also layers of extrinsically conductive polymers, amply described in the literature, can due to their mechanical characteristics be advantageously used in place of the graphite layer for particular cases of the described apparatus, such as for example for attaining a single electrode 10 and seal piece if graphite cannot be used.

The apparatus thus conceived therefore attains the pre-established objects.

The invention claimed is:

1. An apparatus for treating a fluid, the apparatus comprising:
    at least one pair of electrode layers, the electrode layers of said pair facing each other and being separated by a spacing distance delimiting at least one passage chamber, the passage chamber being configured to be traversed by at least one first fluid flow containing ionized particles and exerting hydraulic pressure on at least one first wet surface of said electrode layers;
    a power supply for charging the electrode layers of said pair of electrode layers to different polarities;
    retention elements configured to transmit a mechanical counter-pressure on said at least one pair of electrode layers in order to prevent the electrode layers moving away;
wherein each electrode layer of said at least one pair of electrode layers (10) comprises:
    at least one metal conduction layer electrically connected to said power supply and provided with at least one first contact surface, and
    at least one first impermeable layer of graphite arranged as a sealing cover on the first contact surface of said metal conduction layer, as a separation of said metal conduction layer from said first fluid flow;
wherein the first impermeable layer of graphite comprises said at least one first wet surface directed towards said passage chamber, and wherein the first impermeable layer of graphite comprises a first dry surface compressed, by the hydraulic pressure exerted by said fluid contained in said passage chamber, directly in adherence against the first contact surface of said metal conduction layer, in order to distribute the current of said power supply from said metal conduction layer to said first impermeable layer of graphite.

2. The apparatus for treating a fluid according to claim 1, the apparatus comprising at least a plurality of pairs of the electrode layers arranged in succession along at least one direction orthogonal to the layer-like extension of the electrode layers, the plurality of pairs of the electrode layers delimiting a plurality of the passage chambers and being locked in mutual position by said retention elements;
    the metal conduction layer of each said electrode layer being provided with a second contact surface oriented in a direction opposite the first contact surface;
    wherein each electrode layer also comprises at least one second impermeable layer of graphite arranged as a sealing cover on the second contact surface of said metal conduction layer, as a separation of said metal conduction layer from said first fluid flow;
    wherein the second impermeable layer of graphite comprises a second wet surface directed towards a passage chamber contiguous with the passage chamber towards which said first wet surface is directed, and wherein the second impermeable layer of graphite comprising a second dry surface compressed by the hydraulic pressure directly in adherence against the second contact surface of said metal conduction layer in order to distribute the current of said power supply from said metal conduction layer to said second impermeable layer of graphite.

3. The apparatus for treating a fluid according to claim 2, wherein the metal conduction layer of each electrode layer is configured to be compressed at its opposite first and second contact surfaces in a balanced manner, balanced by the opposite pressures exerted by the first and second dry surfaces of said first and second impermeable layer of graphite.

4. The apparatus for treating a fluid according to claim 1, wherein said at least one impermeable graphite layer and said metal conduction layer of each said electrode layer are perimetrically closed by sealing elements in order to prevent fluid infiltration.

5. The apparatus for treating a fluid according to claim 4, wherein said sealing elements comprise a perimeter cord of glue.

6. The apparatus for treating a fluid according to claim 2, wherein said electrode layer is configured in the form of a bag with two said first and second impermeable graphite layers defining a closed envelope containing said metal conduction layer.

7. The apparatus for treating a fluid according to claim 1, wherein the retention elements are configured to exert on the electrode layers a reaction for balancing the pressure exerted by the first fluid flow on said electrode layers.

8. Apparatus for treating a fluid according to claim 1, wherein said metal conduction layer is an aluminum sheet.

9. The apparatus for treating a fluid according to claim 1, wherein the wet surface of said at least one impermeable graphite layer is covered with a carbon layer.

10. The apparatus for treating a fluid according to claim 9, wherein said carbon layer is in turn covered by an ion exchange membrane.

11. The apparatus for treating a fluid according to claim 2, wherein said plurality of pairs of electrode layers is extended with spiral progression.

12. The apparatus for treating a fluid according to claim 1, wherein said retention elements comprise one or more tie rods acting on said at least one pair of electrodes in order to compact them together.

13. The apparatus for treating a fluid according to claim 1, wherein said retention elements comprise at least one containment body configured to compact together said at least one pair of electrodes.

14. The apparatus for treating a fluid according to claim 1, wherein said at least one impermeable graphite layer is impregnated with a waterproofing material.

15. The apparatus for treating a fluid according to claim 14, wherein the waterproofing material is a waterproofing polymer.

16. The apparatus for treating a fluid according to claim 1, wherein said at least one impermeable graphite layer has thickness comprised between 0.05 mm and 1.5 mm.

* * * * *